(12) United States Patent
Yerramalli et al.

(10) Patent No.: US 11,438,119 B2
(45) Date of Patent: Sep. 6, 2022

(54) REFERENCE SIGNAL AND SUPPLEMENTAL SIGNAL CONFIGURATIONS

(71) Applicant: QUALCOMM Incorporated, San Diego, CA (US)

(72) Inventors: Srinivas Yerramalli, Hyderabad (IN); Alexandros Manolakos, Escondido, CA (US); Mukesh Kumar, Dinanagar (IN); Rajat Prakash, San Diego, CA (US); Xiaoxia Zhang, San Diego, CA (US); Mohammad Tarek Fahim, Tucson, AZ (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 17/100,401

(22) Filed: Nov. 20, 2020

(65) Prior Publication Data

US 2022/0166575 A1 May 26, 2022

(51) Int. Cl.
*H04W 74/08* (2009.01)
*H04L 5/00* (2006.01)
*H04W 72/04* (2009.01)

(52) U.S. Cl.
CPC ....... *H04L 5/0048* (2013.01); *H04W 72/0453* (2013.01)

(58) Field of Classification Search
CPC .......................... H04L 5/0048; H04W 72/0453
See application file for complete search history.

(56) References Cited

U.S. PATENT DOCUMENTS

| 10,285,069 | B2 * | 5/2019 | Zhang | H04W 74/04 |
| 2013/0107893 | A1 * | 5/2013 | Zhang | H04L 5/0023 |
| | | | | 375/340 |
| 2015/0296359 | A1 * | 10/2015 | Edge | G01S 1/20 |
| | | | | 455/404.2 |
| 2015/0296385 | A1 * | 10/2015 | Zhang | H04W 16/14 |
| | | | | 370/329 |
| 2018/0091350 | A1 | 3/2018 | Akkarakaran et al. | |

(Continued)

FOREIGN PATENT DOCUMENTS

WO    WO-2021040501 A  *  3/2021

OTHER PUBLICATIONS

International Search Report and Written Opinion—PCT/US2021/055622—ISA/EPO—dated Jan. 31, 2022.

*Primary Examiner* — Jay P Patel
(74) *Attorney, Agent, or Firm* — Hunter Clark PLLC

(57) ABSTRACT

A user equipment includes a processor configured to: receive a first, second, and third reference signals including a first, second, and third sets of tones, and spanning first, second, and third frequency ranges in first and second sets of symbols and at least one third symbol, respectively, the first and second frequency ranges differing; where at least one of (1) the third frequency range overlaps the first frequency range, or (2) the at least one third symbol overlaps with the first set of symbols and the third frequency range overlaps the second frequency range; determine an offset between the first reference signal and the supplemental signal using the third set of tones; and determine a first indication, of a time and/or a range, based on a combination of the first reference signal and the second reference signal using the offset.

62 Claims, 13 Drawing Sheets

(56) References Cited

U.S. PATENT DOCUMENTS

2018/0109958 A1\* 4/2018 Zhang .................. H04W 16/14
2020/0296550 A1   9/2020 Akkarakaran et al.
2021/0360635 A1\* 11/2021 Sahraei ............. H04W 72/0453

\* cited by examiner

1400

| 1410 | 1420 | 1430 |
|---|---|---|
| Frequencies | PRS properties | Supplemental signal parameters |
| Carrier1, Carrier2 | Property value(s) | Number of symbols, subcarriers |

| 1510 | 1520 | 1530 | 1540 |
|---|---|---|---|
| Position information | PRS | Supplemental signal | Accuracy |
| ToA, RSTD, Rx-Tx | Type and/or property(ies) | Properties | ToA - Xns<br>RSTD - Yns<br>Rx-Tx - Zns |

FIG. 15

REFERENCE SIGNAL AND SUPPLEMENTAL SIGNAL CONFIGURATIONS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax), fifth-generation (5G), etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment includes: a transceiver; a memory; and a processor communicatively coupled to the transceiver and the memory and configured to: receive, via the transceiver, a first reference signal comprising a first set of tones, per instance of the first reference signal, spanning a first frequency range in a first set of symbols; receive, via the transceiver, a second reference signal comprising a second set of tones, per instance of the second reference signal, spanning a second frequency range in a second set of symbols, the first frequency range being at least partially different from the second frequency range; receive, via the transceiver, a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range; determine at least one offset between the first reference signal and the supplemental signal using the third set of tones from the supplemental signal; and determine a first indication, of at least one of a time or a range, based on a combination of the first reference signal and the second reference signal using the at least one offset.

Implementations of such a user equipment may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the first set of symbols. The processor is configured to use the supplemental signal to determine the at least one offset for multiple resources within a resource set of the first reference signal in response to receiving a second indication, the second indication indicating that the multiple resources within the resource set have similar transmission characteristics. The processor is configured to send a capability message to a network entity, via the transceiver, indicating that the user equipment is capable of combined processing of the first reference signal and the second reference signal using the supplemental signal. The capability message indicates whether a measurement gap is requested for the supplemental signal.

Also or alternatively, implementations of such a user equipment may include one or more of the following features. The supplemental signal is a portion of the second reference signal. The processor is configured to send a capability message to a network entity, via the transceiver, indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal. The at least one offset comprises at least one of a phase offset, a time offset, or a frequency offset.

Another example user equipment includes: means for receiving a first reference signal comprising a first set of tones, per instance of the first reference signal, spanning a first frequency range in a first set of symbols; means for receiving a second reference signal comprising a second set of tones, per instance of the second reference signal, spanning a second frequency range in a second set of symbols, the first frequency range being at least partially different from the second frequency range; means for receiving a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range; means for determining at least one offset between the first reference signal and the supplemental signal using the third set of tones from the supplemental signal; and means for determining a first indication, of at least one of a time or a range, based on a combination of the first reference signal and the second reference signal using the at least one offset.

Implementations of such a user equipment may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the first set of symbols. The means for determining the at least one offset are configured to use the supplemental signal to determine the at least one offset for multiple resources within a resource set of the first reference signal in response to receiving a second indication, the second indication indicating that the multiple resources within the resource set have similar transmission characteristics. The user equipment includes means for sending a capability message to a network entity indicating that the user equipment is capable of combined processing of the first reference signal and the second reference signal using the supplemental signal. The capability message indicates whether a measurement gap is requested for the supplemental signal.

Also or alternatively, implementations of such a user equipment may include one or more of the following features. The supplemental signal is a portion of the second reference signal. The user equipment includes means for sending a capability message to a network entity indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal.

An example method of facilitating position information determination includes: receiving, at a user equipment, a first reference signal comprising a first set of tones, per instance of the first reference signal, spanning a first frequency range in a first set of symbols; receiving, at the user equipment, a second reference signal comprising a second set of tones, per instance of the second reference signal, spanning a second frequency range in a second set of symbols, the first frequency range being at least partially different from the second frequency range; receiving, at the user equipment, a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range; determining, at the user equipment, at least one offset between the first reference signal and the supplemental signal using the third set of tones from the supplemental signal; and determining, at the user equipment, a first indication, of at least one of a time or a range, based on a combination of the first reference signal and the second reference signal using the at least one offset.

Implementations of such a method may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the first set of symbols. Determining the at least one offset comprises using the supplemental signal to determine the at least one offset for multiple resources within a resource set of the first reference signal in response to receiving a second indication, the second indication indicating that the multiple resources within the resource set have similar transmission characteristics. The method includes sending a capability message to a network entity indicating that the user equipment is capable of combined processing of the first reference signal and the second reference signal using the supplemental signal. The capability message indicates whether a measurement gap is requested for the supplemental signal.

Also or alternatively, implementations of such a method may include one or more of the following features. The supplemental signal is a portion of the second reference signal. The method includes sending a capability message to a network entity indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal. The at least one offset comprises at least one of a phase offset, a time offset, or a frequency offset.

An example non-transitory, processor-readable storage medium includes processor-readable instructions configured to cause a processor of a user equipment, to determine position information, to: receive a first reference signal comprising a first set of tones, per instance of the first reference signal, spanning a first frequency range in a first set of symbols; receive a second reference signal comprising a second set of tones, per instance of the second reference signal, spanning a second frequency range in a second set of symbols, the first frequency range being at least partially different from the second frequency range; receive a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range; determine at least one offset between the first reference signal and the supplemental signal using the third set of tones from the supplemental signal; and determine a first indication, of at least one of a time or a range, based on a combination of the first reference signal and the second reference signal using the at least one offset.

Implementations of such a storage medium may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the first set of symbols. The processor-readable instructions configured to cause the processor to determine the at least one offset comprise processor-readable instructions configured to cause the processor to use the supplemental signal to determine the at least one offset for multiple resources within a resource set of the first reference signal in response to receiving a second indication, the second indication indicating that the multiple resources within the resource set have similar transmission characteristics. The storage medium includes processor-readable instructions configured to cause the processor to send a capability message to a network entity indicating that the user equipment is capable of combined processing of the first reference signal and the second reference signal using the supplemental signal. The capability message indicates whether a measurement gap is requested for the supplemental signal.

Also or alternatively, implementations of such a storage medium may include one or more of the following features. The supplemental signal is a portion of the second reference signal. The storage medium includes processor-readable instructions configured to cause the processor to send a capability message to a network entity indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal.

An example telecommunication device includes: a transceiver; a memory; and a processor communicatively coupled to the transceiver and the memory and configured to: transmit, via the transceiver to a receiver, a first reference signal comprising a first set of tones, per instance of the first reference signal, spanning a first frequency range in a first set of symbols; transmit, via the transceiver to the receiver, a second reference signal comprising a second set of tones, per instance of the second reference signal, spanning a second frequency range in a second set of symbols, the first frequency range being at least partially different from the second frequency range; and transmit, via the transceiver to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

Implementations of such a telecommunications device may include one or more of the following features. The processor is configured to transmit the first reference signal, the second reference signal, and the supplemental signal in response to a capability message received from the receiver via the transceiver indicating that the receiver is capable of combined processing of the first reference signal and the second reference signal using the supplemental signal. The processor is configured to schedule a measurement gap for the receiver spanning the at least one third symbol based on the capability message.

Also or alternatively, implementations of such a telecommunications device may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the second set of symbols. The processor is configured to transmit another signal, via the transceiver, that is rate matched with the supplemental signal. The telecommunication device is a transmission/reception point, and the processor is configured to transmit the first reference signal, the second reference signal, and the supplemental signal via the transceiver to a user equipment. The telecommunication device is a user equipment, and the processor is configured to transmit a capability message to the receiver, via the transceiver, indicating that the user equipment is capable of transmitting the first reference signal, the second reference signal, and the supplemental signal. The capability message indicates that the at least one third symbol will overlap in time with the first set of symbols and the third frequency range will overlap the second frequency range.

Also or alternatively, implementations of such a telecommunications device may include one or more of the following features. The processor is configured to transmit, via the transceiver, a transmission characteristic message to the receiver indicating that a plurality of reference signal resources will have similar transmission characteristics.

Another example telecommunication device includes: means for transmitting, to a receiver, a first reference signal comprising a first set of tones, per instance of the first reference signal, spanning a first frequency range in a first set of symbols; means for transmitting, to the receiver, a second reference signal comprising a second set of tones, per instance of the second reference signal, spanning a second frequency range in a second set of symbols, the first frequency range being at least partially different from the second frequency range; and means for transmitting, to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

Implementations of such a telecommunications device may include one or more of the following features. The means for transmitting the first reference signal, the means for transmitting the second reference signal, and the means for transmitting the third reference signal are configured to transmit the first reference signal, the second reference signal, and the supplemental signal in response to a capability message received from the receiver indicating that the receiver is capable of combined processing of the first reference signal and the second reference signal using the supplemental signal. The telecommunication device includes means for scheduling a measurement gap for the receiver spanning the at least one third symbol based on the capability message.

Also or alternatively, implementations of such a telecommunications device may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the second set of symbols. The telecommunication device includes means for transmitting another signal that is rate matched with the supplemental signal. The telecommunication device is a user equipment, and the telecommunication device comprises means for transmitting a capability message to the receiver indicating that the user equipment is capable of transmitting the first reference signal, the second reference signal, and the supplemental signal. The capability message indicates that the at least one third symbol will overlap in time with the first set of symbols and the third frequency range will overlap the second frequency range.

Also or alternatively, implementations of such a telecommunications device may include one or more of the following features. The telecommunication device includes means for transmitting a transmission characteristic message to the receiver indicating that a plurality of reference signal resources will have similar transmission characteristics.

An example method for facilitating reference signal measurement includes: transmitting, from a telecommunication device to a receiver, a first reference signal comprising a first set of tones, per instance of the first reference signal, spanning a first frequency range in a first set of symbols; transmitting, from the telecommunication device to the receiver, a second reference signal comprising a second set of tones, per instance of the second reference signal, spanning a second frequency range in a second set of symbols, the first frequency range being at least partially different from the second frequency range; and transmitting, from the telecommunication device to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

Implementations of such a method may include one or more of the following features. The first reference signal, the second reference signal, and the supplemental signal are transmitted in response to a capability message received by the telecommunication device from the receiver indicating that the receiver is capable of combined processing of the first reference signal and the second reference signal using the supplemental signal. The method includes scheduling a measurement gap for the receiver spanning the at least one third symbol based on the capability message.

Also or alternatively, implementations of such a method may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the second set of symbols. The method includes transmitting another signal that is rate matched with the supplemental signal. The telecommunication device is a transmission/reception point, and the first reference signal, the second reference signal, and the supplemental signal are transmitted to a user equipment. The telecommunication device is a user equipment, and the method includes transmitting a capability message to the receiver indicating that the user equipment is capable of transmitting the first reference signal, the second reference signal, and the supplemental signal. The capability message indicates that the at least one third symbol will overlap in time with the first set of symbols and the third frequency range will overlap the second frequency range.

Also or alternatively, implementations of such a method may include one or more of the following features. The method includes transmitting a transmission characteristic message to the receiver indicating that a plurality of reference signal resources will have similar transmission characteristics.

An example non-transitory, processor-readable storage medium includes processor-readable instructions configured to cause a processor of a telecommunication device, to facilitate reference signal measurement, to: transmit, to a receiver, a first reference signal comprising a first set of tones, per instance of the first reference signal, spanning a first frequency range in a first set of symbols; transmit, to the receiver, a second reference signal comprising a second set of tones, per instance of the second reference signal, spanning a second frequency range in a second set of symbols, the first frequency range being at least partially different from the second frequency range; and transmit, to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

Implementations of such a storage medium may include one or more of the following features. The processor-readable instructions configured to cause the processor to transmit the first reference signal, the second reference signal, and the supplemental signal are configured to cause the processor to transmit the first reference signal, the second reference signal, and the supplemental signal in response to a capability message received by the telecommunication device from the receiver indicating that the receiver is capable of combined processing of the first reference signal and the second reference signal using the supplemental signal. The storage medium includes processor-readable instructions configured to cause the processor to schedule a measurement gap for the receiver spanning the at least one third symbol based on the capability message.

Also or alternatively, implementations of such a storage medium may include one or more of the following features. Each instance of the first reference signal and each instance of the second reference signal are at least partially non-overlapping in time. The third set of tones consists of fewer tones in the second frequency range than the second set of tones. The at least one third symbol consists of fewer symbols than the second set of symbols. The storage medium includes processor-readable instructions configured to cause the processor to transmit another signal that is rate matched with the supplemental signal. The telecommunication device is a user equipment, and the storage medium includes processor-readable instructions configured to cause the processor to transmit a capability message to the receiver indicating that the user equipment is capable of transmitting the first reference signal, the second reference signal, and the supplemental signal. The capability message indicates that the at least one third symbol will overlap in time with the first set of symbols and the third frequency range will overlap the second frequency range.

Also or alternatively, implementations of such a storage medium may include one or more of the following features. The storage medium includes processor-readable instructions configured to cause the processor to transmit a transmission characteristic message to the receiver indicating that a plurality of reference signal resources will have similar transmission characteristics.

BRIEF DESCRIPTION OF THE DRAWINGS

FIG. 14 is an example of a transmission capability message of user equipment capability for sending positioning reference signals for combined processing.

FIG. 15 is an example position information report.

DETAILED DESCRIPTION

Figure 1:
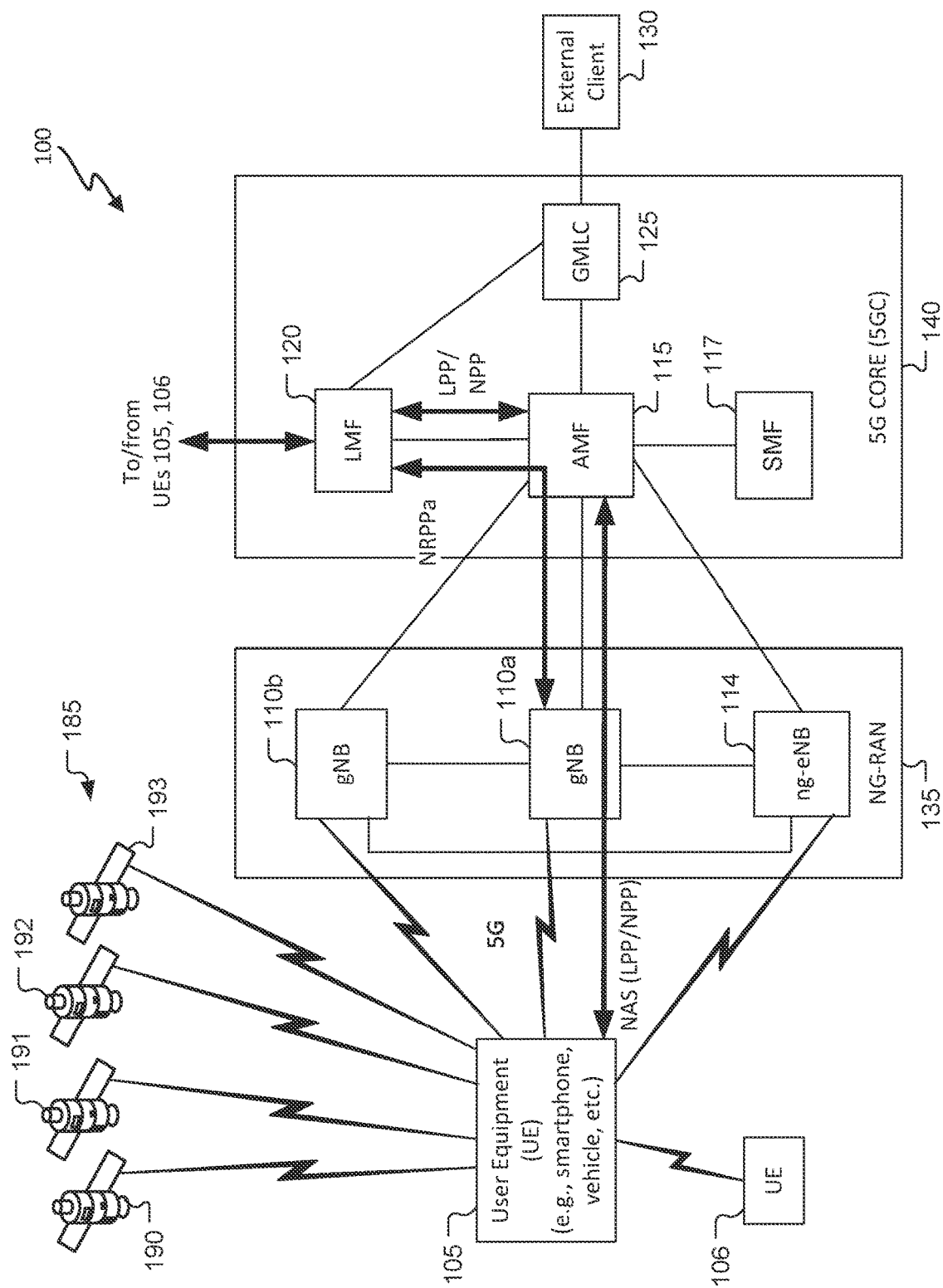
FIG. 1 is a simplified diagram of an example wireless communications system.

Techniques are discussed herein for managing positioning signal processing. For example, a user equipment (UE) may be configured to process time multiplexed reference signals in combination based on a supplemental signal. The supplemental signal may be a portion of one of the reference signals or portions of both of the reference signals overlapping in frequency. The supplemental signal may be separate from the reference signals and may overlap in frequency with one of the reference signals and overlap in time with the other reference signal. For example, the supplemental signal may be a downsampled portion of one of the reference signals, occupying fewer tones (e.g., fewer symbols and/or fewer subcarriers) than the reference signal. The UE may be configured to estimate one or more offsets (e.g., phase offset, timing offset, frequency offset) between the reference signals, use the estimated offset(s) to facilitate processing of the reference signals in combination (as though the reference signals were a single signal), and process the reference signals in combination to determine position information (e.g., one or more measurements, one or more ranges, and/or one or more position estimates, etc.). The UE may also or alternatively be configured to transmit reference signals (e.g., uplink sounding reference signals) and a supplemental signal to facilitate combined processing of the reference signals transmitted by the UE. Also or alternatively, the UE may be configured to provide a capability message indicating the capability of the UE to process reference signals in combination using a supplemental signal. The processing capability indication(s) may indicate pairs of carriers that may be used for reference signals and whether the UE can use a supplemental signal to facilitate the combined processing. The capability indication(s) may indicate a request for the supplemental signal and may indicate a request for a measurement gap corresponding to the supplemental signal. A network entity may configure, e.g., schedule, transmission of the reference signals and the supplemental signal to facilitate combined processing. For example, the network entity may ensure that the reference signals and the supplemental signal meet one or more transmission criteria specified by the UE for combined processing of reference signals and the supplemental signal. The one or more transmission criteria may include the frequencies of the reference signals and the supplemental signal and/or use of the same antenna port for transmitting the reference signals and the supplemental signal. These are examples, and other examples (of UEs and/or criteria) may be implemented.

Items and/or techniques described herein may provide one or more of the following capabilities, as well as other capabilities not mentioned. Mobile device position determination accuracy may be increased, e.g., lateral (horizontal) and/or vertical (altitude) position. Position scheduling accuracy (e.g., coordination of timing of position information being available) may be increased. Latency may be reduced, e.g., by enabling use of frequency resources rather than multiple time resources. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, director indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RT), Multi-Cell RTT, Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM. WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
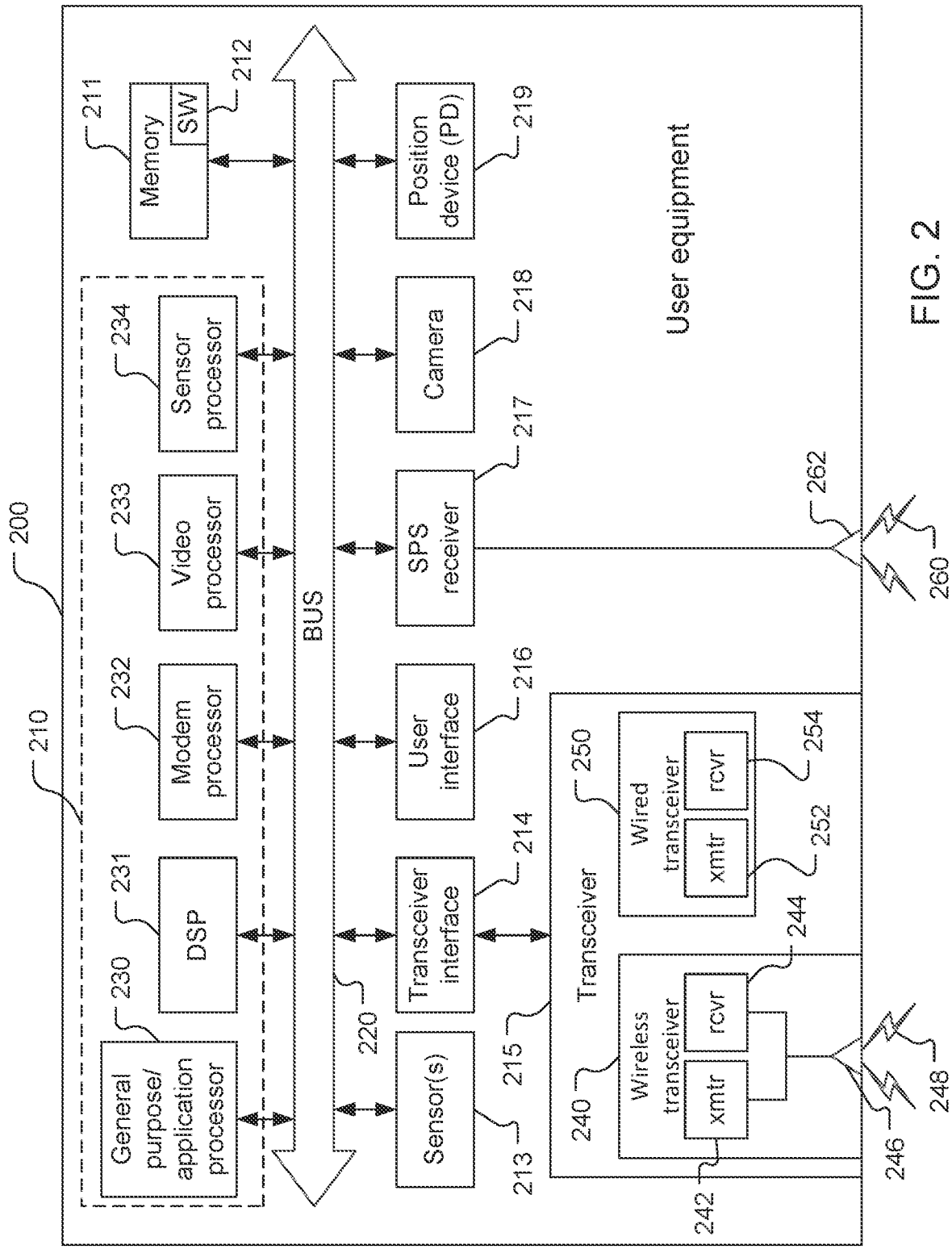
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s), the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., with the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Figure 3:
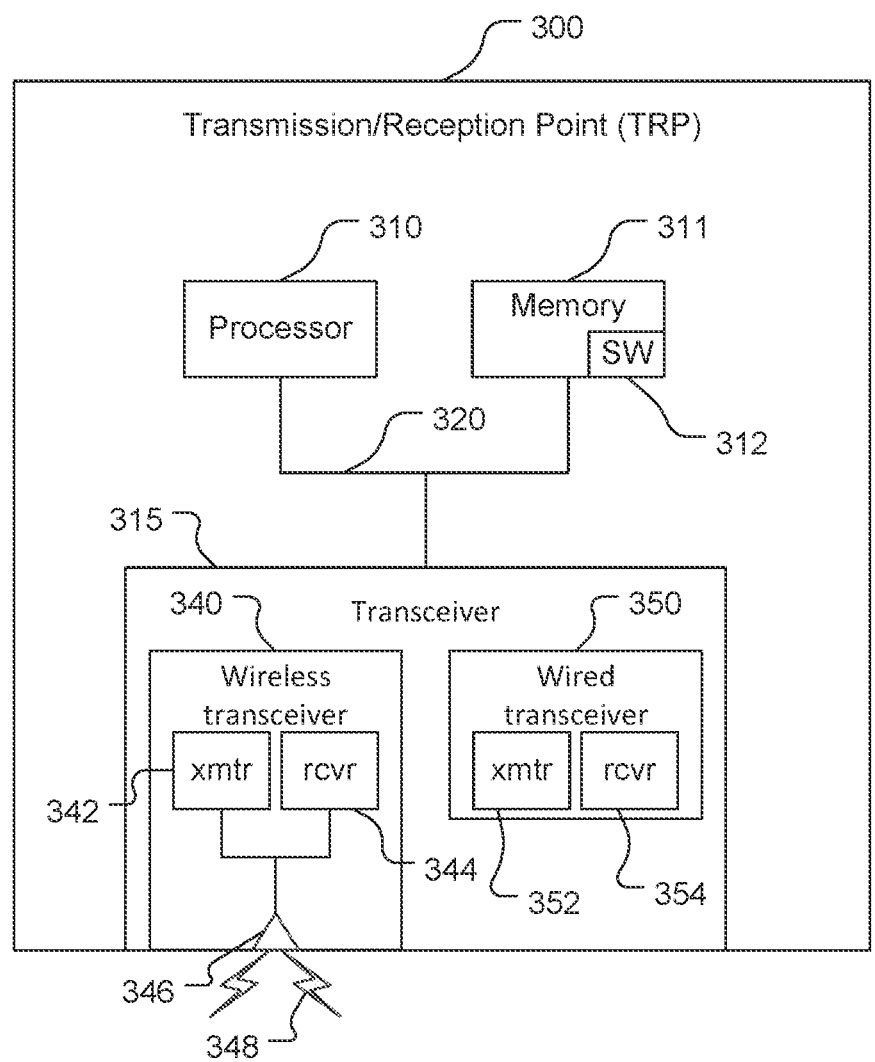
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., with the network 135 to send communications to, and receive communications from, the LMF 120, for example. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
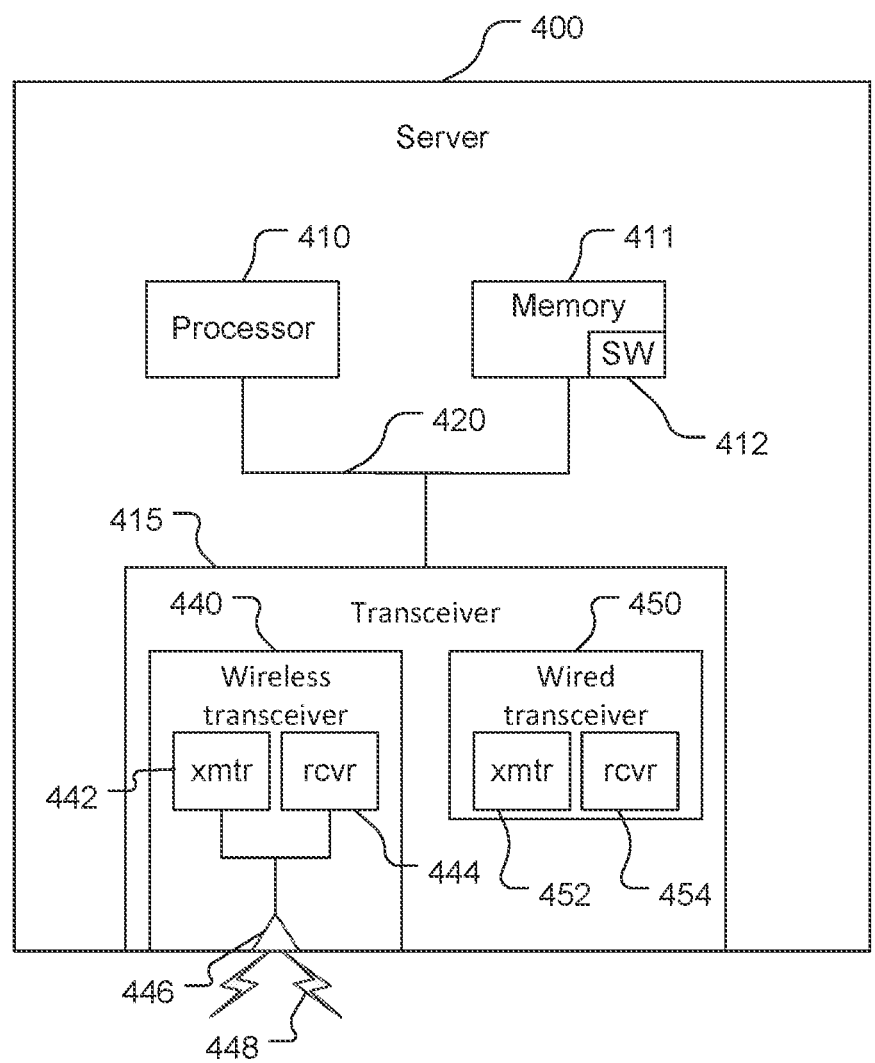
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles). UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., with the network 135 to send communications to, and receive communications from, the TRP 300, for example. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA). Enhanced Cell Identification (E-CID). DL-AoD, UL-AoA, etc. RT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT). PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred to as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

Combined Processing of PRS and Supplemental Signal

Various techniques may be implemented to facilitate and/or improve signal processing of wireless signals, e.g., for positioning. For example, multiple PRS may be transmitted by TRPs with different carrier frequencies and being time multiplexed (with different portions at least partially non-overlapping in time with each other), and the frequency-hopped PRS portions processed in combination to determine position information, e.g., one or more measurements such as ToA, range from a UE to a signal source, position of the UE, etc. The PRS may overlap in frequency and/or time, or may be separated in time and/or frequency without overlap. The determined position information may be of greater accuracy than position information determined from PRS that do not have different carriers and/or that span a smaller bandwidth than the combined PRS. A supplemental signal may be used by the UE (or other device receiving RS) to determine one or more transmission characteristic differences between a first PRS and the supplemental signal (e.g., timing offset, frequency offset, phase offset). The supplemental signal may have similar transmissions characteristics to a second PRS but occupy fewer tones (e.g., fewer symbols and/or fewer subcarriers) than the second PRS. The UE may analyze the supplemental and the first PRS to determine one or more offsets and use the offset(s) to process the first and second PRS in combination to improve measurement accuracy compared to processing the first PRS alone or the second PRS alone.

Figure 5:
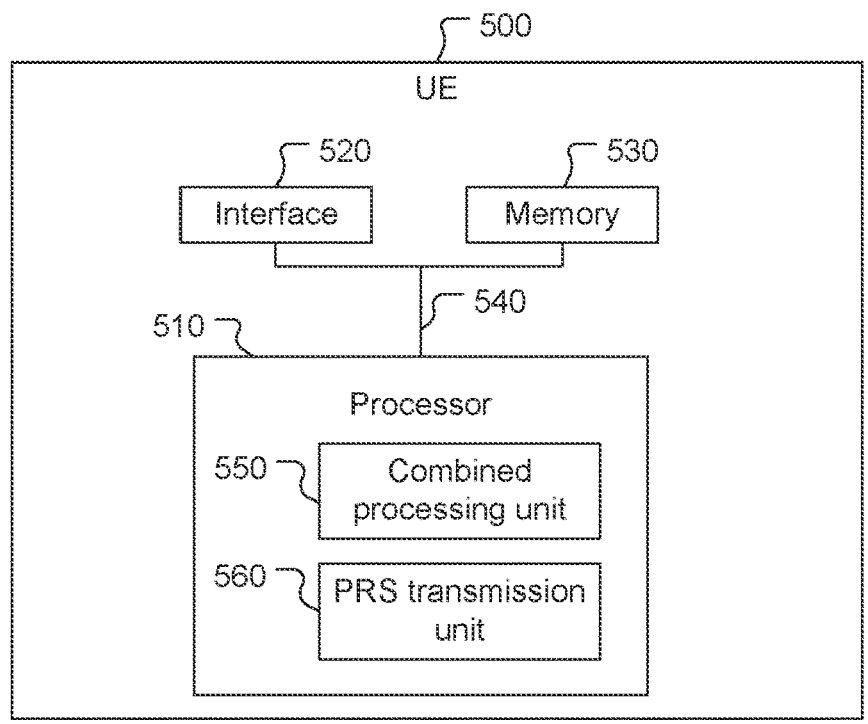
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a combined processing unit 550 configured to process multiple PRS in combination (e.g., coherently or non-coherently combining the PRS) as a single PRS, which may be called stitching, with the aid of a supplemental signal. The combined processing unit 550 may be configured to report one or more processing capabilities of the UE 500 regarding processing the multiple PRS in combination and the supplemental signal and/or to report that the multiple PRS were processed in combination to provide reported position information (e.g., one or more measurements, one or more ranges, one or more position estimates, etc.). The combined processing unit 550 is discussed further below, and the description may refer to the processor 510 generally, or the UE 500 generally, as performing any of the functions of the combined processing unit 550.

Figure 6:
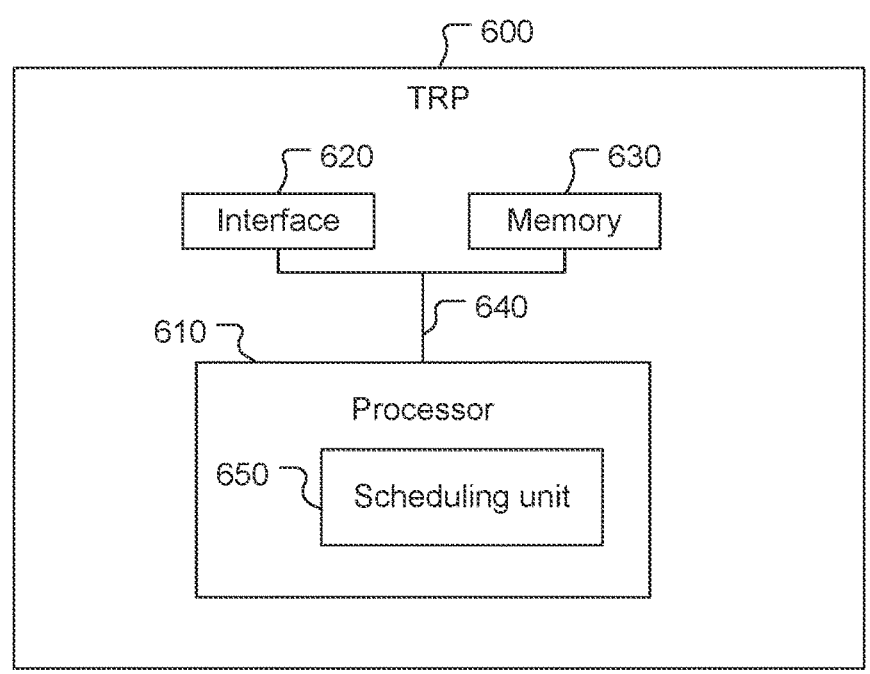
FIG. 6 is a block diagram of an example transmission/reception point.

Referring also to FIG. 6, a TRP 600 includes a processor 610, an interface 620, and a memory 630 communicatively coupled to each other by a bus 640. The TRP 600 may include the components shown in FIG. 6, and may include one or more other components such as any of those shown in FIG. 3 such that the TRP 300 may be an example of the TRP 600. For example, the interface 620 may include one or more of the components of the transceiver 315, e.g., the wireless transmitter 342 and the antenna 346 and/or the wireless receiver 344 and the antenna 346. Also or alternatively, the interface 520 may include the wired transmitter 352 and/or the wired receiver 354. The memory 630 may be configured similarly to the memory 31, e.g., including software with processor-readable instructions configured to cause the processor 610 to perform functions.

The description herein may refer only to the processor 610 performing a function, but this includes other implementations such as where the processor 610 executes software (stored in the memory 630) and/or firmware. The description herein may refer to the TRP 600 performing a function as shorthand for one or more appropriate components (e.g., the processor 610 and the memory 630) of the TRP 600 performing the function. The processor 610 (possibly in conjunction with the memory 630 and, as appropriate, the interface 620) includes a scheduling unit 650. The scheduling unit 650 is configured to transmit multiple DL PRS and a supplemental signal. The supplemental signal may be separate from the DL PRS or may be part of the DL PRS (e.g., tones of multiple PRS that overlap in frequency between the multiple PRS). The scheduling unit 650 may schedule and transmit the PRS and the supplemental signal based on one or more indicated capabilities of the UE 500 to process multiple PRS in combination with the aid of a supplemental signal. The scheduling unit 650 is discussed further herein, and the description may refer to the processor 610 generally, or the TRP 600 generally, as performing any of the functions of the scheduling unit 650.

Figure 7:
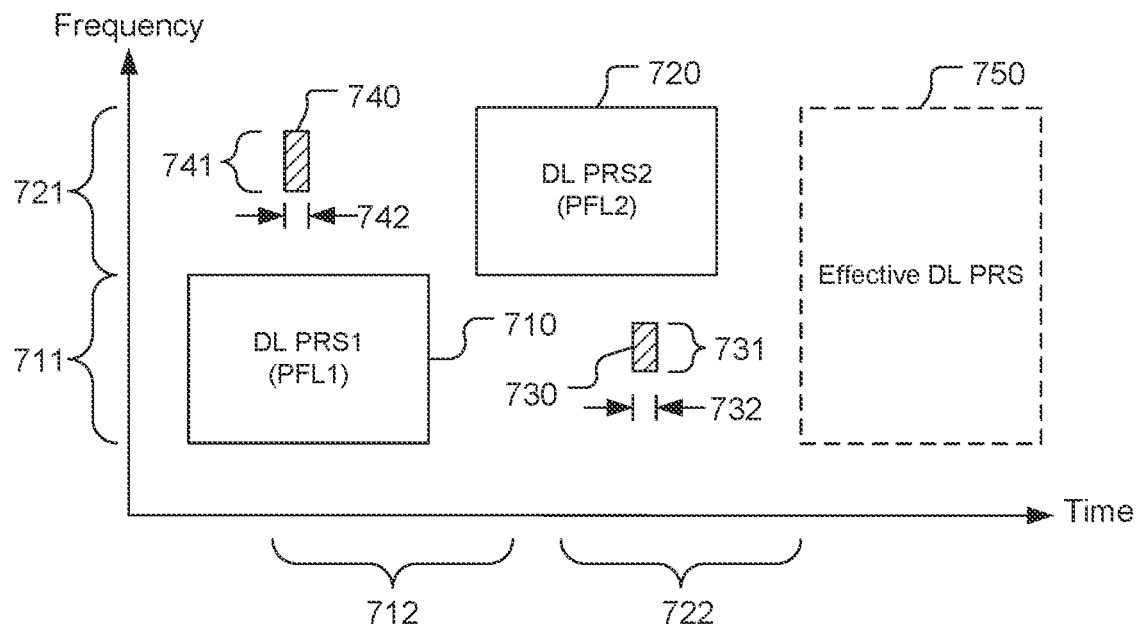
FIG. 7 is a timing diagram of positioning reference signals and supplemental signals.

Referring also to FIG. 7, the scheduling unit 650 may be configured to transmit, via the interface 620, multiple DL PRS and the combined processing unit 550 may be configured to process the multiple DL PRS in combination. In this example, the scheduling unit 650 is configured to schedule and transmit a first DL PRS 710 and a second DL PRS 720. The first DL PRS 710 in transmitted in a first positioning frequency layer (PFL1) with each instance spanning a first frequency range 711 and a first time window 712. The first DL PRS 710 is sounded in tones (e.g., OFDM tones) over the first frequency range 711 and the first time window 712 although not necessarily being sounded in every tone over the first frequency range 711 or every symbol over the first time window 712. Similarly, the second DL PRS 720 in transmitted in a second positioning frequency layer (PFL2) with each instance spanning a second frequency range 721 and a second time window 722. The DL PRS 710, 720 shown are frequency multiplexed, with the frequency ranges 711, 721 not overlapping. With the DL PRS 710, 720 at least partially non-overlapping in frequency, the combined processing unit 550 may process the DL PRS 710, 720 in combination to provide a larger bandwidth of the combined signal, which may help improve accuracy of measurement of the combined signal compared to measurement of the first DL PRS 710 alone or measurement of the second DL PRS 720 alone. The DL PRS 710, 720 shown are also time multiplexed, with the time windows 712, 722 not overlapping. Time multiplexing of the DL PRS 710, 720 allows for other signaling (e.g., PDSCH (Physical Downlink Shared Channel), PDCCH (Physical Downlink Control Channel)) to be conveyed concurrently with the DL PRS 710, 720. The DL PRS 710, 720 may span different amounts of frequencies (i.e., the size of the frequency range 711 may be larger, smaller, or the same as the size of the frequency range 721). The DL PRS 710, 720 may span different amounts of time (i.e., the size of the first time window 712 may be larger, smaller, or the same as the size of the size of the second time window 722). The frequency ranges 711, 721 may be within a single carrier frequency or may be of different carrier frequencies.

The scheduling unit 650 may also be configured to transmit one or more supplemental signals, e.g., a first supplemental signal 730 and/or a second supplemental signal 740. The first supplemental signal 730 is transmitted in the first frequency layer, spans a first supplemental frequency range 731 and a first supplemental time window 732, and the second supplemental signal 740 is transmitted in the second frequency layer, spans a second supplemental frequency range 741 and a second supplemental time window 742. The first supplemental frequency range 731 overlaps with the first frequency range 711 and the first supplemental time window 732 overlaps with the second time window 722, and the second supplemental frequency range 741 overlaps with the second frequency range 721 and the second supplemental time window 742 overlaps with the first time window 712. Each of the supplemental signals 730, 740 may be sounded in fewer subcarriers than the respective DL PRS 710, 720 of the same frequency layer and may be sounded in fewer symbols than the respective DL PRS 720, 710 overlapping in time with the respective supplemental signal 730, 740. The supplemental signals 730, 740 may span different amounts of frequencies (i.e., the size of the first supplemental frequency range 731 may be larger, smaller, or the same as the size of the second supplemental frequency range 741). The supplemental signals 730, 740 may span different amounts of time (i.e., the size of the first supplemental time window 732 may be larger, smaller, or the same as the size of the size of the second supplemental time window 742). The first supplemental signal 730 may be a sub-sampled portion of the first DL PRS 710 and/or the second supplemental signal 740 may be a sub-sampled portion of the second DL PRS 720. Either or both of the supplemental signals 730, 740 may have fewer repetitions than the corresponding DL PRS 710, 720. The supplemental signals 730, 740 occupy fewer resources than the DL PRS 710, 720, thus reducing overhead compared to the DL PRS 710, 720 while permitting estimation of one or more offsets to facilitate combined processing of the DL PRS 710, 720 and while permitting other signaling to be frequency multiplexed with the DL PRS 710, 720 during the respective time windows 712, 722. The supplemental signals 730, 740 may each have lower frequency densities than the respective DL PRS 710, 720, and the supplemental signals 730, 740 may have different frequency densities.

Figure 8:
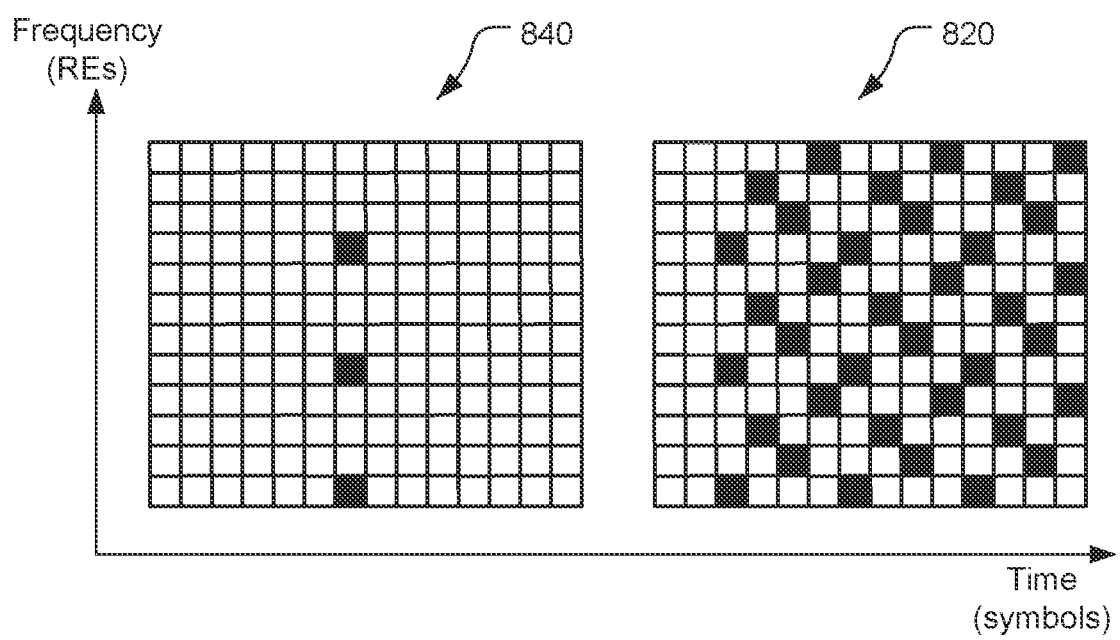
FIG. 8 is a timing diagram of a resource block of one supplemental signal shown in FIG. 7 and a resource block of one positioning reference signal shown in FIG. 7.

Referring also to FIG. 8, the supplemental signals 730, 740 may have any of various frequency densities. For example, the supplemental signals 730, 740 may have high frequency densities, e.g., with every second or every fourth resource element (RE) within a sounded resource block (RB) being sounded. In the example shown in FIG. 8, a slot 840 of one RB of the second supplemental signal 740 has every fourth RE sounded whereas a slot 820 of a corresponding RB of the second DL PRS 720 is a comb-4, fully staggered transmission pattern with three repetitions per slot. The supplemental signals 730, 740 may be sounded in multiple consecutive RBs corresponding to the respective DL PRS 710, 720, but possibly fewer RBs than contained in the DL PRS 710, 720. Supplemental signals may have shorter time spans than corresponding RS. For example, an RS resource may span two, four, eight, or twelve symbols but a supplemental signal may span fewer symbols than the corresponding RS, e.g., one symbol per instance or two symbols per instance. As shown, the supplemental signal 740 may be sounded in a single symbol.

Figure 9:
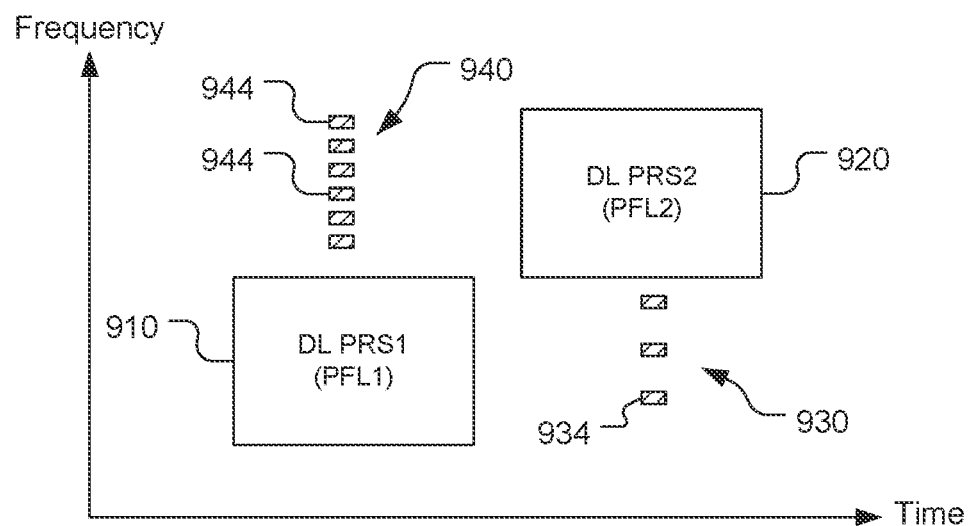
FIG. 9 is a timing diagram of positioning reference signals and supplemental signals.
Figure 10:
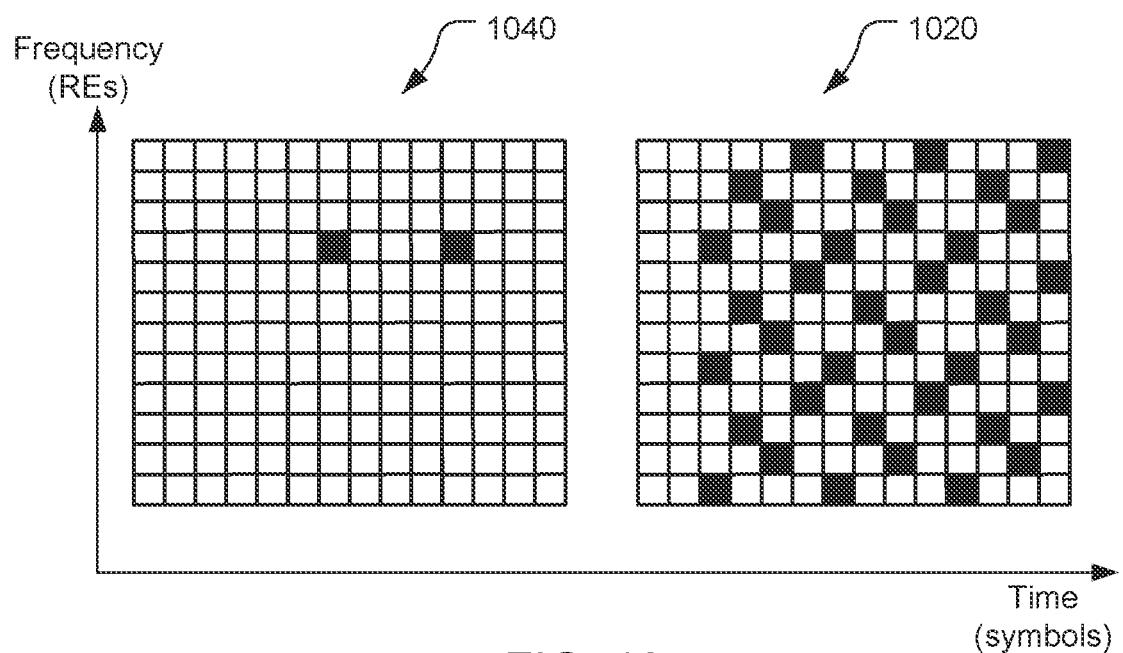
FIG. 10 is a timing diagram of a resource block of one supplemental signal shown in FIG. 9 and a resource block of one positioning reference signal shown in FIG. 9.

Referring also to FIGS. 9 and 10, the supplemental signals 730, 740 may have low frequency densities, e.g., with one or more REs sounded in one of every two or every four RBs. In the example shown in FIG. 9, a first supplemental signal 930 is sounded in three RBs 934, e.g., every fourth RB of a corresponding first DL PRS 910 and a second supplemental signal 940 is sounded in six RBs 944, e.g., every second RB of a corresponding second DL PRS 920. As shown in FIG. 10, a slot 1040 of one of the RBs 944 of the second supplemental signal 940 is sounded in a single RE in each of two symbols whereas a slot 1020 of a corresponding RB of the second DL PRS 920 is a comb-4, fully staggered transmission pattern with three repetitions per slot.

The scheduling unit 650 may be configured to schedule one or more signals to be rate matched with the supplemental signal(s) to multiplex the supplemental signal(s) with one or more other signals, e.g., one or more low-latency signals. For example, the scheduling unit 650 may be configured to sound PDSCH or PDCCH signal RBs and REs using the RBs and REs not used by the supplemental signals 730, 740, 930, 940 to multiplex the supplemental signal(s) and the other physical channel(s). For example, the scheduling unit 650 may use the framework provided by PTRS (Phase Tracking RS) signal configuration and rate matching to multiplex the signals. Thus, other information using one or more other signals may be scheduled around the REs sounded for the supplemental signal(s), e.g., including interlacing other signal REs with the supplemental signal REs.

The scheduling unit 650 may implement one or more enhanced measurement gaps for the supplemental signal(s). The scheduling unit 650 may schedule a measurement gap for the DL PRS and for the supplemental signal(s) while allowing for measurement of other signals for times/frequencies other than when the DL PRS and supplemental signal(s) are sounded. For example, the scheduling unit may schedule a measurement gap for the first frequency range 711 (e.g., for a carrier including the first frequency range 711) during the first time window 712 and for (at least) the second supplemental frequency range 741 (a carrier including the second supplemental frequency range 741), or even the second frequency range 721, during the second supplemental time window 742, while not scheduling a measurement gap for the second frequency range 721 during the first time window 712 other than the second supplemental time window 742.

Figure 11:
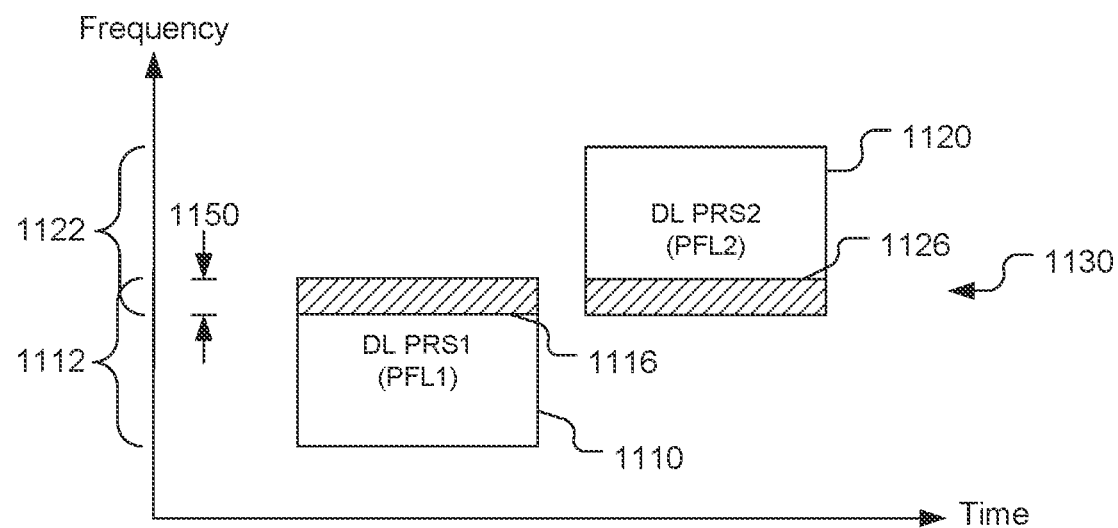
FIG. 11 is a timing diagram of positioning reference signals that include a supplemental signal.

Referring also to FIG. 11, a supplemental signal may comprise a portion of one or more reference signals. For example, a portion 1116 of a first DL PRS 1110 may overlap in frequency with a portion 1126 of a second DL PRS 1120, with a frequency range 1112 of the first DL PRS 1110 overlapping with a frequency range 1122 of the second DL PRS 1120 in an overlapping frequency range 1150. A supplemental signal 1130 may comprise the portion 1116 of the first DL PRS 1110 and/or the portion 1126 of the second DL PRS 1120, i.e., the shared RBs of the DL PRS 1110, 1120.

The combined processing unit 550 may be configured to use the supplemental signal(s) to determine one or more parameters that may be used to combine multiple RS for combined processing to determine position information. Multiple RS may be produced using different hardware, e.g., different oscillators, different power amplifiers, etc. and thus may have different transmission characteristics independent of different channels encountered in transit between a transmitter and a receiver. The different transmission characteristics of multiple RS may result in one or more offsets between the RS, e.g., a timing offset, a phase offset, and/or a frequency offset. The combined processing unit 550 may be configured to analyze the supplemental signal(s) to estimate the offset(s) between the multiple RS. For example, the combined processing unit 550 may be configured to determine one or more offsets between the DL PRS 710, 720 using the first DL PRS 710 and the first supplemental signal 730 and/or using the second DL PRS 720 and the second supplemental signal 740. As another example, the combined processing unit 550 may be configured to estimate one or more offsets between the DL PRS 910, 920 using the first DL PRS 910 and the first supplemental signal 930 and/or using the second DL PRS 920 and the second supplemental signal 940. For example, the combined processing unit 550 may comprise a cross correlator and be configured to compare impulse responses of PRS and one or more supplemental signals. The combined processing unit 550 may be configured to determine a channel impulse response (CIR), e.g., for each PRS (e.g., the DL PRS 710, 720) and one or more supplemental signals (e.g., the supplemental signals 730, 740). The combined processing unit 550 may determine the CIR by performing an inverse fast fourier transform (IFFT) on a channel frequency response (CFR) determined from each of the PRS and each of the supplemental signals. The combined processing unit 550 may be configured to determine a phase offset by comparing the phases of the CIRs of a PRS and a supplemental signal (e.g., determining $\phi$ such that vector1=$e^{j\phi}$vector2 where vector1 is the CIR of a PRS and vector2 is the CIR of a supplemental signal. The combined processing unit 550 may be configured to determine the phase offset using a well-known algorithm such as a least squares algorithm. The higher-density supplemental signals 730, 740 may yield a finer resolution vector and thus a more accurate phase offset value than the lower-density supplemental signals 930, 940. The combined processing unit 550 may analyze time-domain peaks of the CIRs of the PRS and the supplemental signal (e.g., the PRS 710 and the supplemental signal 740), taking into account an expected (e.g., scheduled) time difference of the peaks, to determine the time offset between the PRS and the supplemental signal. The combined processing unit 550 may analyze multiple time offsets (e.g., of multiple instances of the PRS 710 and the supplemental signal 740, or the time offset of the PRS 710 and the supplemental signal 740 and the time offset of the PRS 720 and the supplemental signal 730) to determine a frequency offset. The frequency offset is proportional to a difference, if any, between the multiple time offsets.

The supplemental signal(s) need not overlap in time with the RS with respect to which the offset(s) is(are) to be determined, but overlapping in time may improve the accuracy of the estimated offset(s) compared to using a supplemental signal that does not overlap in time with the corresponding RS. Use of overlapping RS to provide the supplemental signal may help reduce overhead and complexity of providing the supplemental signal whereas use of one or more supplemental signals separate from the RS may improve bandwidth of the combined signal and thus improve accuracy of determined position information compared to frequency-overlapping RS providing the supplemental signal.

The combined processing unit 550 may use the estimated offset(s) to compensate the RS (e.g., one of the multiple RS) such that the multiple RS may be treated as a single RS, with an effective bandwidth of the sum of the non-overlapping bandwidths of the individual RS, and processed in combination to yield position information, e.g., a single ToA for the combined RS from which further position information may be determined. For example, with the offset(s) determined, the combined processing unit 550 may adjust values of samples of the received PRS, e.g., the PRS 710, 720, to make the received PRS be a single effective PRS with time continuity and phase continuity, e.g., an effective PRS 750.

The combined processing unit 550 may be configured to process the multiple PRS in combination, e.g., to apply one or more algorithms to the combined, effective PRS. For example, the combined processing unit 550 may be configured to process the effective (combined) PRS with a single IFFT (Inverse Fast Fourier Transform) and/or with a single correlation. The combined processing may be used to determine an IFFT-based first arrival path, to determine an energy-based first arrival path, and/or to determine a super-resolution-based first arrival path. The processing of the effective PRS may determine an indication of time and/or range, e.g., a time of arrival and/or a range to a source of the PRS. The combined processing unit 550 may be configured to use the indication of time and/or range to determine position information (e.g., a measurement or a position of the UE 500), although numerous other techniques of combined processing may be used. Combining the multiple PRS having at least some non-shared tones (each spanning some frequency range not spanned by the other) will increase the effective PRS processing bandwidth to a composite bandwidth, e.g., to a sum of the combined PRS. The combined processing may increase position determination performance, e.g., ToA accuracy (e.g., due to finer resolution, i.e., more frequent, sampling in the time domain). The combined processing unit 550 may, for example, populate an IFFT buffer with samples from different frequencies of the PRS and the supplemental signal (e.g., different center frequencies) as if the multiple PRS were transmitted in the same symbols.

While supplemental signals and corresponding RS may be transmitted from different antenna ports, the supplemental signal and the multiple RS may be transmitted from the same antenna port to help ensure that the supplemental signal and the multiple RS encounter the same or similar channel conditions. This may help the combined processing unit 550 to determine the offset(s) between the multiple RS accurately, thus helping the combined processing unit 550 to combine the multiple RS accurately, and thus improving the accuracy of position information determined from the combined processing of the multiple RS. The combined processing unit 550 may be configured to request, and possibly require, that the supplemental signal(s) and the corresponding RS (or even all of the RS to be combined) are transmitted from the same antenna port.

A supplemental signal may correspond to one or more RS resources. For example, each DL PRS resource may have a separate supplemental signal transmitted corresponding to the DL PRS resource. As another example, for a DL PRS resource set with the same or similar (e.g., within one or more corresponding thresholds) transmission characteristics, a single supplemental signal may be transmitted corresponding to the DL PRS resources within the DL PRS resource set. For example, a set of DL PRS resources experiencing the same timing/frequency/phase offset may have a common supplemental signal.

The scheduling unit 650 may send an indication as to which RS resource(s) a supplemental signal corresponds and/or may send one or more indications of transmission characteristics of RS and/or may send one or more indications of which RS resources have similar transmission characteristics.

Figure 12:
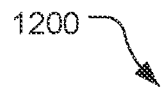
FIG. 12 is an example capability message of user equipment capability for combined positioning reference signal processing.

Referring also to FIG. 12, the combined processing unit 550 may be configured to report the capability of the UE 500 to process multiple PRS in combination based on a supplemental signal, i.e., to stitch multiple PRS using a supplemental signal. The combined processing unit 550 may be configured to report that the UE 500 may process the PRS and the supplemental signal along with one or more criteria affecting the ability of the UE 500 to stitch the PRS based on the supplemental signal. The combined processing unit 550 may be configured to send a capability message 1200, e.g., to the TRP 600 including a frequencies field 1210, a PRS properties field 1220, a combined signal processing capability field 1230, a supplemental signal parameters field 1240, a measurement gap field 1250, and an accuracy field 1260. The capability message 1200 is an example, and one or more of the fields shown of the message 1200 may be omitted, and one or more other fields not shown added (i.e., included). For example, the combined processing capability field 1230 may be omitted, with the presence of values in one or more of the included fields implying the ability to stitch signals. As another example, message 1200 may include an indication of a processing time of the UE 500 to process a combination of multiple PRS. As another example, the message 1200 may include a request or requirement that the multiple PRS are transmitted by the TRP 600 using the same antenna port.

The various fields of the message 1200 indicate whether the UE 500 is capable of processing signals in combination, meeting the corresponding criteria indicated, and possibly what accuracy may be provided by the UE 500 for the signals meeting the criteria. For example, the combined processing capability field 1230 may indicate whether the UE 500 is able to stitch multiple PRS of the carrier frequencies (of positioning frequency layers (PFLs)) indicated in the frequencies field 1210. The fields other than the combined processing capability field 1230 and the accuracy field 1260 may indicate values to be satisfied in order for the UE 500 to be capable of providing (or for the UE 500 to guarantee provision of) the accuracy(ies) indicated in the accuracy field 1260. For example, the PRS properties field 1220 may indicate one or more parameters for the PRS of the indicated frequencies (e.g., PFL parameters) to have in order for the combined processing unit 550 to be capable of processing the multiple PRS in combination. For example, the PRS properties may include frequency layer, comb number, numerology (e.g., subcarrier spacing (SCS)), etc. The PRS properties may include a PRS type, e.g., DL-PRS, SL-PRS, UL-PRS, which may imply one or more other properties. The PRS properties may include a maximum time separation (e.g., a maximum time gap between the PRS (e.g., an end of an instance of a first PRS and a beginning of an instance of a second PRS to be processed in combination with the first PRS). The maximum time separation may be specified in time (e.g., nanoseconds) or other terms, e.g., symbols. The PRS properties may include a maximum phase offset and/or a maximum timing offset of the PRS to be able to be processed in combination. The supplemental signal parameters field 1240 may indicate one or more parameters of a supplemental signal requested (possibly required) for the UE 500 to receive in order to process PRS of the indicated frequencies in the field 1210 in combination, at least while providing the indicated accuracy(ies) (discussed below). The combined processing unit 550 may thus indicate the capability of the UE 500 to process multiple PRS in combination on a per frequency-pair basis. The frequencies may be in a single frequency band or in different frequency bands. For an indication in the combined processing capability field 1230 that stitching is not supported for the corresponding frequencies, the remaining fields of the message 1200 may be filled with null values. The supplemental signal parameters field 1240 may provide signal parameters (e.g., number of symbols, sounded subcarriers, etc.) for one or more supplemental signals corresponding to the indicated PRS. The measurement gap field 1250 may provide parameters defining an enhanced measurement gap for the PRS and the supplemental signal(s). The accuracy field 1260 may indicate one or more minimum accuracies of one or more indicated position information types, e.g., measurement accuracy(ies) of ToA, RSTD, Rx-Tx, etc., that can be provided by the UE 500 if the criteria of the other fields are met.

The combined processing unit 550 may be configured provide an indication of what quality of processing can be provided with corresponding combined PRS processing. For example, the combined processing unit 550 may report an error rate as part of the accuracy and may be configured to report what accuracy may be achieved for a future positioning signal measurement based on a corresponding combination of PRS and supplemental signal. Different accuracies may be provided for different bandwidths of the combined PRS (e.g., 50% absolute ToA error of 5 ns with a 100 MHz bandwidth, 2.5 ns with a 200 MHz bandwidth, and 1.2 ns with a 400 MHz bandwidth). The accuracy that may be achieved by the combined processing unit 550 may depend on a total frequency of the combined PRS and/or may depend on the frequency span of the combined PRS and not the total bandwidth of the PRS and the supplemental signal individually (e.g., 300 MHz for signals of 200 MHz each that overlap by 100 MHz).

One or more of the fields of the message 1200 may be coded. For example, one or more potential values for a field may be stored in the memory 530 (e.g., statically during manufacture or dynamically in accordance with one or more received messages) and the value of a field coded (e.g., a bit string) to indicate which value of the potential value(s) to use. For a single potential value, the bit string may be a single bit indicating whether or not to use the prestored value.

Figure 13:
FIG. 13 is an example positioning reference signal, supplemental signal, and data signal configuration message.

The TRP 600 may be configured to schedule and provide PRS to the UE 500 to enable and/or facilitate the UE 500 to process multiple PRS in combination. For example, referring also to FIG. 13, the TRP 600 may send a scheduling message 1300 including a signal field 1310 indicating signals scheduled by the TRP 600, e.g., signals to be sent to the UE 500, and a signal parameters field 1320 indicating corresponding signal parameters. The signal parameters may include, for example, one or more offsets (e.g., slot offset, symbol offset), comb number, number of symbols, repetition factor, etc. of the corresponding signals. The TRP 300 may schedule the PRS based on the capability message 1200 or may schedule the PRS independently of the capability message 1200, e.g., before receiving the message 1200 or regardless of the message 1200.

The UE 500 may send the capability message 1200, or another form of capability message, to the TRP 600 in response to receiving the scheduling message 1300. For example, the combined processing unit 550 may base the values of one or more of the fields of the capability message 1200 on values of the message 1300. Also or alternatively, the combined processing unit 550 may send a capability message indicating whether the UE 500 can process the PRS indicated in the scheduling message 1300 in combination, and possibly the accuracy that the UE 500 will provide based on the combined processing.

Referring also to FIG. 14, the PRS transmission unit 560 may be configured to transmit a transmission capability message 1400 indicating that the UE 500 is capable of transmitting multiple PRS (e.g., UL PRS also called SRS for positioning or UL SRS) and one or more supplemental signals, e.g., as shown in FIGS. 7, 9, and 11. The UE 500, e.g., the PRS transmission unit 560, may be configured to transmit multiple PRS and one or more supplemental signals similar to the discussion herein regarding the TRP 600 and may send, e.g., to the TRP 600 or another TRP 300, the transmission capability message 1400. The message 1400 includes a frequencies field 1410, a PRS properties field 1420, and a supplemental signal parameters field 1430. The field 1410 may indicate carrier frequencies of positioning frequency layers of PRS that the UE 500 can transmit. The PRS properties field 1420 may indicate one or more other properties of the PRS, e.g., comb number, offsets, etc. of the frequencies indicated in the field 1410. The supplemental signal parameters field 1430 may indicate one or more parameters of one or more supplemental signals that the UE 500 can transmit in conjunction with (e.g., overlapping in time and/or frequency with) the indicated PRS. The PRS transmission unit 560 may be configured to transmit the supplemental signal(s) using the same power control loop, and the same timing advance and other parameter values as other SRS of a given carrier frequency. The contents of the fields 1410, 1420, 1430 may be similar or the same as the contents of the fields 1210, 1220, 1240 of the capability message 1200. The scheduling unit 650 may respond to receiving the transmission capability message 1400 by scheduling transmission of the PRS and supplemental signal(s) indicated in the transmission capability message 1400.

Referring also to FIG. 15, the combined processing unit 550 may be configured to send a report 1500 of position information and corresponding signals processed in combination to determine the position information. In this example, the report 1500 includes a position information field 1510, a PRS field 1520, a supplemental signal field 1530, and an accuracy field 1540. The position information field 1510 indicates the position information determined and being reported. The position information may include, for example, a ToA value, an RSTD value, an Rx-Tx value, a position estimate, and/or a range, etc. The PRS field 1520 indicates the multiple PRS that were used to determine the position information. The PRS field 1520 may indicate types of PRS and/or one or more properties of the PRS used. The supplemental signal field 1530 may indicate one or more properties of the supplemental signal(s) used in to estimate one or more parameters (e.g., one or more offsets between the multiple PRS) to facilitate combined processing of the multiple PRS as effectively one PRS. The accuracy field 1540 may report what accuracy (possibly including what error rate) the determined position information (e.g., positioning measurement) has, e.g., based on the signals combined to determine the position information.

Operation

Figure 16:
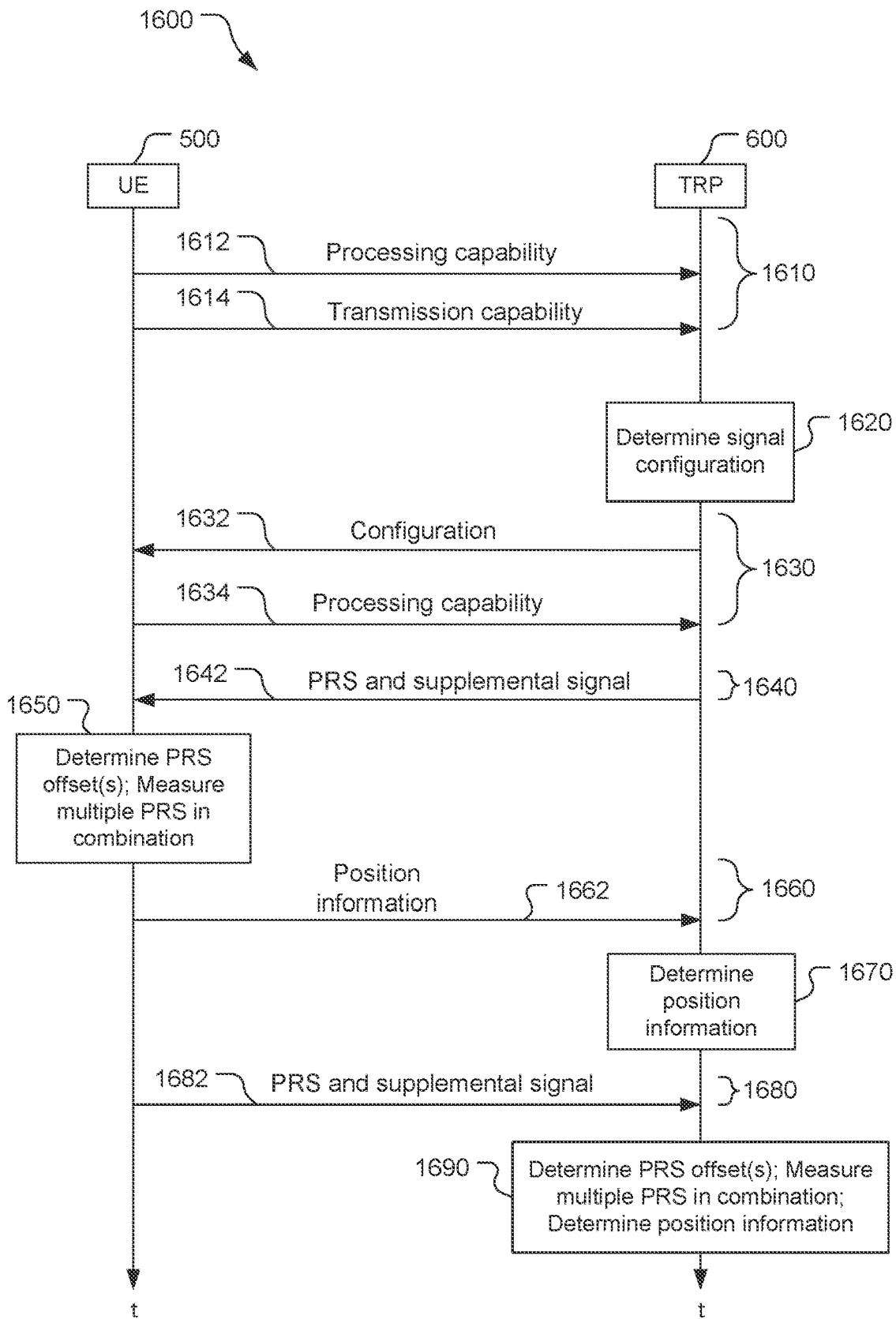
FIG. 16 is a signaling and process flow for determining position information.

Referring to FIG. 16, with further reference to FIGS. 1-15, a signaling and process flow 1600 for determining position information from combined processing of multiple PRS using a supplemental signal includes the stages shown. The flow 1600 is an example only, as stages may be added, rearranged, and/or removed.

At stage 1610, the UE 500 sends a processing capability message 1612 and/or a transmission capability message 1614 to the TRP 600. For example, the combined processing unit 550 may send indications of the capability of the UE 500 to process multiple PRS with the aid of one or more supplemental signals. The combined processing unit 550 may send, for example, the capability message 1200 to the TRP 600. Also or alternatively, the PRS transmission unit 560 may send indications of the capability of the UE 500 to send multiple RS and one or more supplemental signals to aid with combined processing of the multiple RS. For example, the PRS transmission unit 560 may send the transmission capability message 1400 to the TRP 600. The UE 500 may be configured with the combined processing unit 550 to process received PRS in combination with the help of a supplemental signal and to indicate the capability(ies) of the UE 500 to do so, or may be with the PRS transmission unit 560 to transmit multiple PRS and one or more associated supplemental signals to aid combined processing of the PRS and to indicate the capability(ies) of the UE 500 to do so, or may be configured with the combined processing unit 550 and the PRS transmission unit 560.

At stage 1620, the TRP 600 determines the signal configuration for signals to be processed in combination by the UE 500 and/or signals to be sent by the UE for combined processing. The scheduling unit 650 may use information from the processing capability message 1612 to determine properties (e.g., frequency, timing, measurement gap(s), etc.) of PRS and a supplemental signal to facilitate and/or enable combined processing of the PRS by the UE 500. The scheduling unit 650 may use one or more criteria not in the processing capability message 1612 to determine PRS and a supplemental signal that the UE 500 will be able to use to process the PRS in combination to meet one or more performance criteria, e.g., at least a threshold accuracy and/or no more than a threshold latency. Also or alternatively, the scheduling unit 650 may determine the configuration of the PRS and the supplemental signal (e.g., signal properties, measurement gap(s), etc.) that the UE 500 indicated could be sent by the UE 500 for use by another entity (e.g., the TRP 600, another TRP 300, another UE 500) to process the PRS from the UE 500 in combination.

At stage 1630, the TRP 600 sends a configuration message 1632 to the UE 500 with the determined signal configuration(s). For example, the scheduling unit 650 may send the scheduling message 1300, e.g., indicating the configuration for the multiple PRS and the supplemental signal(s) to be sent to the UE 500 and/or the multiple PRS and the supplemental signal to be sent by the UE 500. The TRP 600 may, for example, indicate for the UE 500 to send the PRS and the supplemental signal using the same antenna port. The UE 500 may send a processing capability message 1634 (e.g., the capability message 1200) to the TRP 600 in response to the configuration message 1632. The processing capability message 1634 may be a simplified message, e.g., indicating whether or not the UE 500 can process, in combination, the PRS indicated in the configuration message 1632. The UE 500 may send the processing capability message 1634 instead of or in addition to sending processing capabilities in the processing capability message 1612.

At stage 1640, the TRP 600 sends a PRS and supplemental signal message 1642 to the UE 500 including multiple PRS and one or more supplemental signals. The multiple PRS and the supplemental signal(s) of the PRS and supplemental signal message 1642 are sent in accordance with the configurations indicated by the configuration message 1632 (e.g., with the PRS being at least partially TDMed and at least partially FDMed) and are received by the UE 500.

At stage 1650, the UE 500 determines position information. For example, the combined processing unit 550 may use one or more of the received PRS, and use the corresponding supplemental signal(s), to estimate one or more offsets between the different PRS. The combined processing unit 550 may process the PRS in combination (e.g., by coherently combining the different PRS, if possible, or non-coherently combining the PRS) to determine one or more measurements, e.g., ToA. For example, the processor 510 may process samples of the multiple PRS jointly with a single IFFT to determine a measurement (e.g., ToA, RSTD). The processor 510 may use one or more measurements to determine other position information, e.g., may use multiple measurements to determine a position estimate of the UE 500, range to another entity, etc.

At stage 1660, the UE 500 may send position information to the TRP 600 in a position information message 1662. The position information message 1662 may include raw signal information and/or processed positioning signal information such as a positioning reference signal measurement and/or a position of the UE 500. The determined position of the UE 500 may be called a position estimate. The position information message 1662 may include information regarding the PRS processed in combination to determine the corresponding position information. For example, the message 1662 may include the report 1500 indicating that what PRS were processed in combination, and possibly what supplemental signal was used to aid the combined processing, and the accuracy of the position information. The information regarding the PRS processed to determine the position information may be included in a quality metric. The UE 500 may report the combined processing of the PRS even if the UE 500 did not send processing capability information, e.g., in processing capability message 1612 and/or in the processing capability message 1634, and/or the TRP 600 did not receive the processing capability information or use the processing capability information for the configuration of the PRS and/or the supplemental signal. For example, the TRP 600 may send the PRS and the supplemental signal with configurations (e.g., properties) that enable the UE 500 to use the supplemental to process the PRS in combination, regardless of why the configurations were used. The UE 500 may indicate that combined processing of PRS were performed regardless of why the combined processing was performed.

At stage 1670, the TRP 600 may determine position information for the UE 500. The TRP 600 may collect position information from one or more of the position information messages 1662 and perform one or more positioning techniques to determine further position information for, e.g., the location of, the UE 500, and/or may provide information to another entity, e.g., the server 400 (e.g., an LMF), for calculation of position information. The TRP 600 may use position information from the message(s) 1662 to update previously-determined position information for the UE 500. The TRP 600 may determine accuracy of the position information based on the reported capability(ies) of the UE 500 for processing the PRS, an indication of the actual processing performed by the UE 500 on the PRS, and/or properties of the PRS processed by the UE 500. Thus, the position information accuracy may be implicitly determined in addition to or instead of an explicit indication of the accuracy provided by the UE 500.

At stage 1680, the UE 500 may send PRS and a supplemental signal message 1682 with multiple PRS and one or more supplemental signals. For example, the PRS transmission unit 560 may send multiple PRS (e.g., UL SRS) and one or more supplemental signals indicated in the transmission capability message 1614 that the UE 500 can send, and that were scheduled by the TRP 600.

At stage 1690, the TRP 600 determines position information. For example, the TRP 600 may estimate one or more offsets of received PRS using the supplemental signal(s) provided in the PRS and supplemental signal message 1682 similar to the UE 500 determine the offset(s) and measure multiple PRS in combination at stage 1650 to determine position information. The position information may include the measurements and/or position information determined from the measurements (e.g., ranges, locations, etc.).

Figure 17:
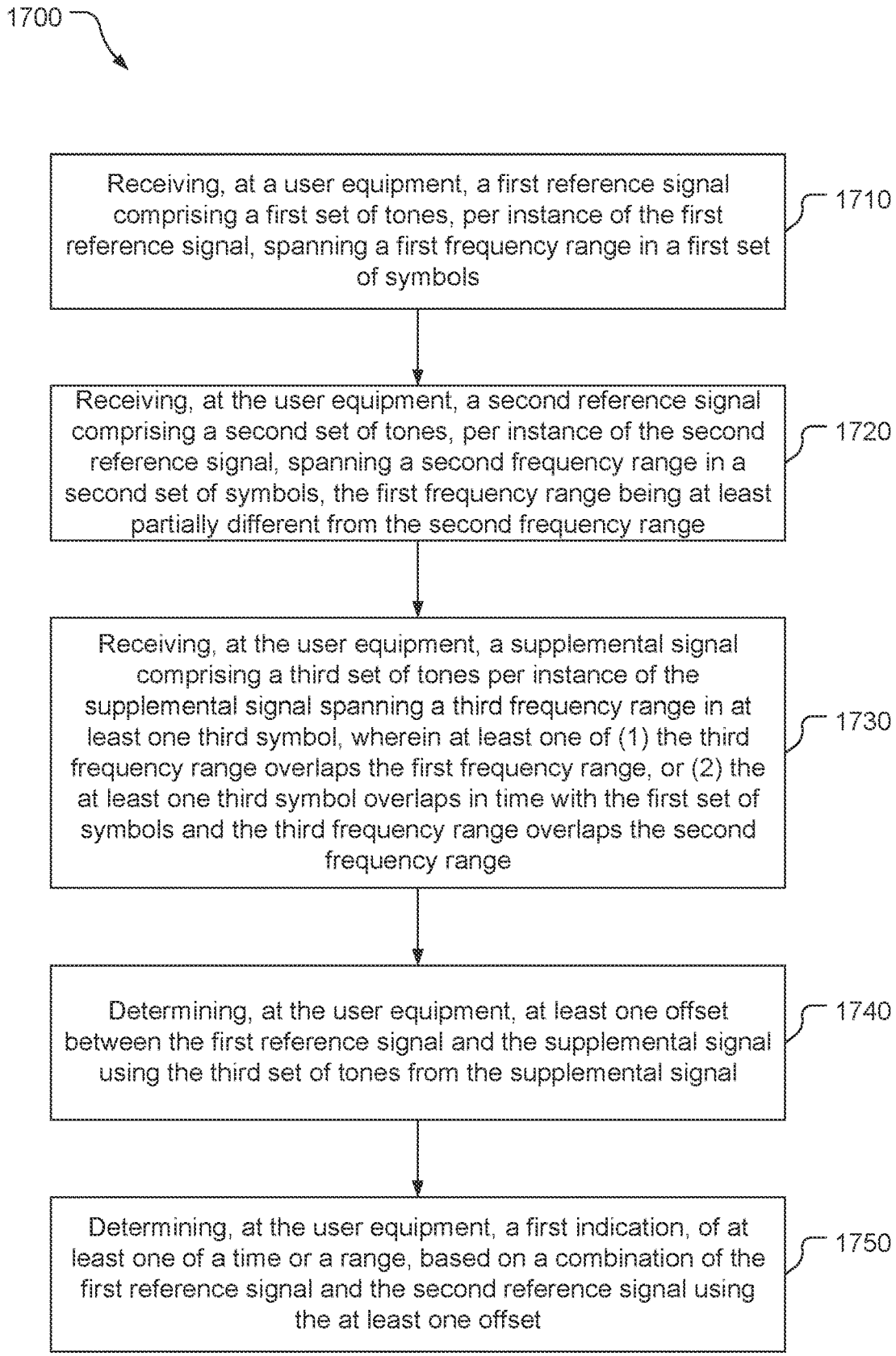
FIG. 17 is a block flow diagram of a method of facilitating position information determination.

Referring to FIG. 17, with further reference to FIGS. 1-16, a method 1700 of facilitating position information determination includes the stages shown. The method 1700 is, however, an example only and not limiting. The method 1700 may be altered, e.g., by having stages added, removed, rearranged, combined, performed concurrently, and/or having single stages split into multiple stages.

At stage 1710, the method 1700 includes receiving, at a user equipment, a first reference signal comprising a first set of tones, per instance of the first reference signal, spanning a first frequency range in a first set of symbols. For example, the UE 500 receives a PRS in the PRS and supplemental signal message 1640. The UE 500 may receive, e.g., the first DL PRS 710 spanning the first frequency range 711 or the first DL PRS 1110 spanning the first frequency range 1112. The processor 510, the memory 530, and the interface 520 (e.g., the wireless receiver 244 and the antenna 246) may comprise means for receiving the first reference signal.

At stage 1720, the method 1700 includes receiving, at the user equipment, a second reference signal comprising a second set of tones, per instance of the second reference signal, spanning a second frequency range in a second set of symbols, the first frequency range being at least partially different from the second frequency range. For example, the UE 500 receives another PRS in the PRS and supplemental signal message 1640. The UE 500 may receive, e.g., the second DL PRS 720 spanning the second frequency range 721 or the second DL PRS 1120 spanning the first frequency range 1122. The processor 510, the memory 530, and the interface 520 (e.g., the wireless receiver 244 and the antenna 246) may comprise means for receiving the second reference signal.

At stage 1730, the method 1700 includes receiving, at the user equipment, a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range. For example, the UE 500 receives the portion 1126 of the second DL PRS 1120 as (at least a portion of) the supplemental signal and spanning the overlapping frequency range 1150 of the first frequency range 1112 of the first DL PRS 1110. As another example, the UE 500 receives the second supplemental signal 740 overlapping in time with the first DL PRS 710 (i.e., the second supplemental time window 742 overlaps a portion of the first time window 712) and spanning the frequency range 741 that overlaps the second frequency range 721 (overlapping a portion of, and sharing subcarriers with, the second frequency range 721 of the second DL PRS 720). The supplemental signal may or may not be sounded in the same symbol(s) as the reference signal with which the supplemental signal overlaps in time (e.g., if the reference signal is not sounded in all symbols). The processor 510, the memory 530, and the interface 520 (e.g., the wireless receiver 244 and the antenna 246) may comprise means for receiving the supplemental signal.

At stage 1740, the method 1700 includes determining, at the user equipment, at least one offset between the first reference signal and the supplemental signal using the third set of tones from the supplemental signal. For example, the combined processing unit 550 uses the supplemental signal (e.g., the portion 1126 of the second DL PRS 1120 or the second supplemental signal 740) and the first reference signal (e.g., the first DL PRS 1110 or the first DL PRS 710) to determine phase offset and/or timing offset between the supplemental signal and the first reference signal, and/or multiple PRS and corresponding supplemental signals to determine frequency offset, and thus determines (e.g., estimates) the offset(s) between the first reference signal and the second reference signal. For example, as discussed, the combined processing unit 550 may compute the CIRs of a PRS and a supplemental signal and analyze the CIRs to determine phase offset and time offset, and analyze multiple time offsets to determine frequency offset. The processor 510 and the memory 530 may comprise means for determining the at least one offset.

At stage 1750, the method 1700 includes determining, at the user equipment, a first indication, of at least one of a time or a range, based on a combination of the first reference signal and the second reference signal using the at least one offset. For example, the combined processing unit 550 may use the estimated offset(s), as discussed (e.g., adjusting sample values), to make the first and second reference signals (e.g., the first DL PRS 1110 and the second DL PRS 1120, or the first DL PRS 710 and the second DL PRS 720) one effective reference signal (e.g., the effective PRS 750) and process the effective reference signal (the combination of the first and second reference signals) to determine one or more indications of time and/or range (e.g., ToA, RSRP, pseudorange, etc.). The processor 510 and the memory 530 may comprise means for determining the first indication based on the combination of the first reference signal and the second reference signal using the at least one offset.

Implementations of the method 1700 may include one or more of the following features. In an example implementation, each instance of the first reference signal and each instance of the second reference signal are at least partially non-overlapping in time. For example, the first DL PRS 710 and the second DL PRS 720 are separated in time. In another example implementation, the third set of tones consists of fewer tones in the second frequency range than the second set of tones. For example, the supplemental signal may be sounded in fewer tones (fewer subcarriers) within the frequency range of the corresponding reference signal with which the supplemental signal overlaps in frequency (e.g., the second supplemental signal 740 has fewer tones (at least in the second frequency range 721) than the second DL PRS 720). The supplemental signal may, however, have tones outside the frequency range of the corresponding reference signal. In another example implementation, the at least one third symbol consists of fewer symbols than the first set of symbols. For example, the second supplemental signal 740 has fewer symbols, e.g., one symbol, per instance (e.g., during the first time window 712). In another example implementation, estimating the at least one offset comprises using the supplemental signal to estimate the at least one offset for multiple resources within a resource set of the first reference signal in response to receiving a second indication, the second indication indicating that the multiple resources within the resource set have similar transmission characteristics. For example, the combined processing unit 550 may use a single supplemental signal to estimate the offset(s) for more than one PRS resource, e.g., where a group of DL PRS resources within a resource set have the same or similar offset(s). The combined processing unit 550 may use the offset(s) determined for one of the resources in the set for all of the resources in the set.

Also or alternatively, implementations of the method 1700 may include one or more of the following features. In an example implementation, the method 1700 includes sending a capability message to a network entity indicating that the user equipment is capable of combined processing of the first reference signal and the second reference signal using the supplemental signal. For example, the combined processing unit 550 may produce and send the capability message 1200 to the TRP 600 indicating the ability of the UE 500 to process PRS in combination with the aid of one or more supplemental signals. The processor 510, the memory 530, and the interface 520 (e.g., the wireless transmitter 242 and the antenna 246) may comprise means for sending the capability message. In another example implementation, the capability message indicates whether a measurement gap is requested for the supplemental signal. In another example implementation, the supplemental signal is a portion of the second reference signal. For example, the supplemental signal may be the portion 1126 of the second DL PRS 1120. In another example implementation, the method 1700 includes sending a capability message to a network entity indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal. For example, the PRS transmission unit 560 may send the transmission capability message 1400 indicating the ability of the UE 500 to send multiple PRS and one or more supplemental signals to aid in combined processing of the multiple PRS, with the one or more supplemental signals overlapping in time with one or more corresponding reference signals. The processor 510, the memory 530, and the interface 520 (e.g., the wireless transmitter 242 and the antenna 246) may comprise means for sending the capability message. The at least one offset comprises at least one of a phase offset, a time offset, or a frequency offset (i.e., a phase offset, a time offset, and/or a frequency offset).

Figure 18:
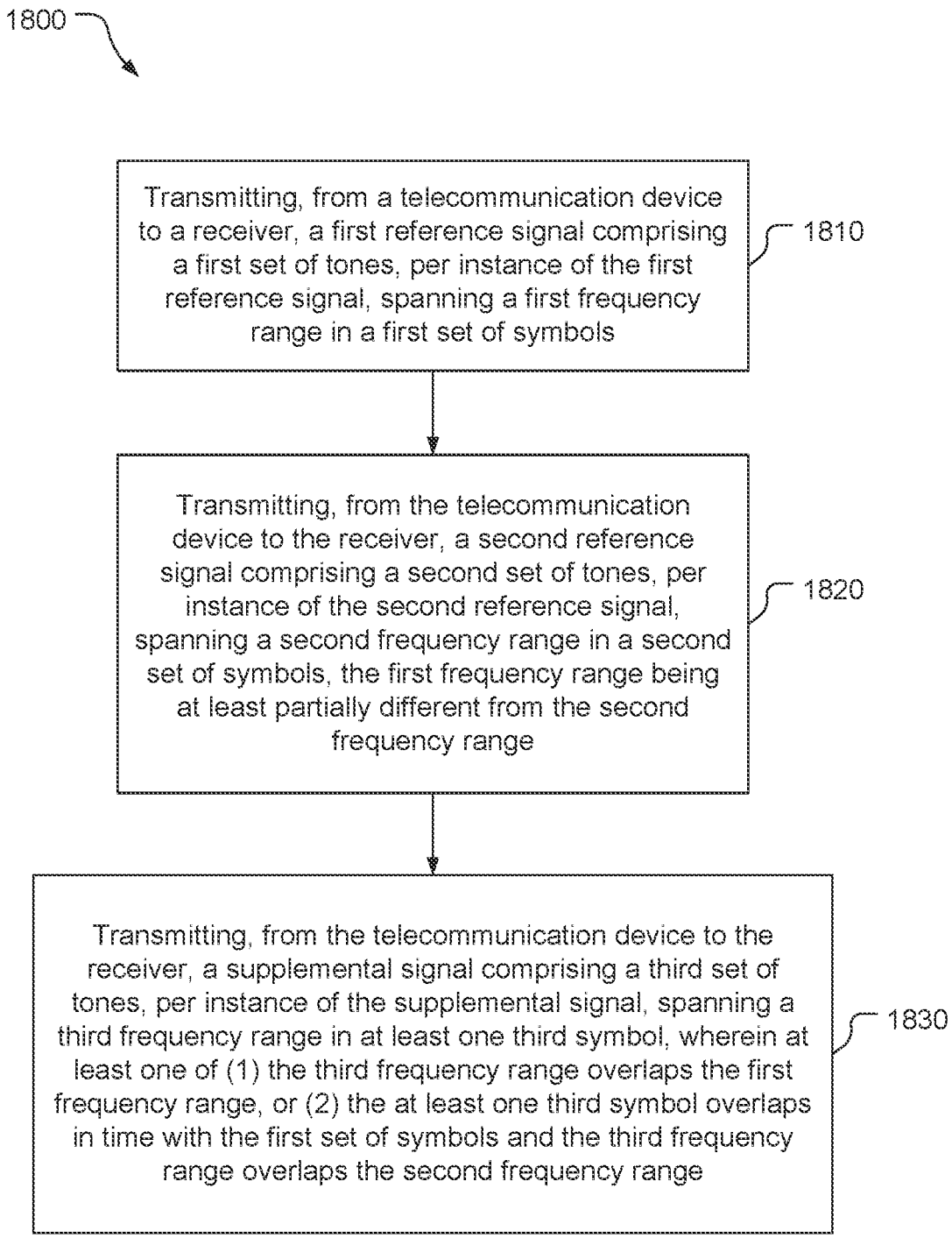
FIG. 18 is a block flow diagram of a method for facilitating reference signal measurement.

Referring to FIG. 18, with further reference to FIGS. 1-16, a method 1800 for facilitating reference signal measurement includes the stages shown. The method 1800 is, however, an example only and not limiting. The method 1800 may be altered, e.g., by having stages added, removed, rearranged, combined, performed concurrently, and/or having single stages split into multiple stages.

At stage 1810, the method 1800 includes transmitting, from a telecommunication device to a receiver, a first reference signal comprising a first set of tones, per instance of the first reference signal, spanning a first frequency range in a first set of symbols. For example, the TRP 600 sends the first DL PRS 710 to the UE 500. As another example, the UE 500, e.g., the PRS transmission unit 560 may send a first UL SRS to the TRP 600. The first UL SRS may, for example, sound similar tones as the first DL PRS 710 over a similar time window, but be in a UL SRS format rather than a DL PRS format. The processor 610, the memory 630, and the interface 620 (e.g., the wireless transmitter 342 and the antenna 346) may comprise means for transmitting the first reference signal. Alternatively, the processor 510, the memory 530, and the interface 520 (e.g., the wireless transmitter 242 and the antenna 246) may comprise means for transmitting the first reference signal.

At stage 1820, the method 1800 includes transmitting, from the telecommunication device to the receiver, a second reference signal comprising a second set of tones, per instance of the second reference signal, spanning a second frequency range in a second set of symbols, the first frequency range being at least partially different from the second frequency range. For example, the TRP 600 sends the second DL PRS 720 to the UE 500. As another example, the UE 500, e.g., the PRS transmission unit 560 may send a second UL SRS to the TRP 600. The second UL SRS may, for example, sound similar tones as the second DL PRS 720 over a similar time window, but be in a UL SRS format rather than a DL PRS format. The processor 610, the memory 630, and the interface 620 (e.g., the wireless transmitter 342 and the antenna 346) may comprise means for transmitting the second reference signal. Alternatively, the processor 510, the memory 530, and the interface 520 (e.g., the warless transmitter 242 and the antenna 246) may comprise means for transmitting the second reference signal.

At stage 1830, the method 1800 includes transmitting, from the telecommunication device to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range. For example, the TRP 600 sends the first supplemental signal 730 (and/or the second supplemental signal 740) to the UE 500. As another example, the UE 500, e.g., the PRS transmission unit 560 may send one or more supplemental signals to the TRP 600. The supplemental signal(s) from the UE 500 may, for example, sound similar tones as the first supplemental signal 730 and/or the second supplemental signal 740 over the same or similar time window(s), but be in a UL SRS format rather than a DL PRS format. The supplemental signal may or may not be sounded in the same symbol(s) as the reference signal with which the supplemental signal overlaps in time (e.g., if the reference signal is not sounded in all symbols). The processor 610, the memory 630, and the interface 620 (e.g., the wireless transmitter 342 and the antenna 346) may comprise means for transmitting the supplemental signal. Alternatively, the processor 510, the memory 530, and the interface 520 (e.g., the wireless transmitter 242 and the antenna 246) may comprise means for transmitting the supplemental signal.

Implementations of the method 1800 may include one or more of the following features. In an example implementation, the first reference signal, the second reference signal, and the supplemental signal are transmitted in response to a capability message received by the telecommunication device from the receiver indicating that the receiver is capable of combined processing of the first reference signal and the second reference signal using the supplemental signal. For example, the TRP 600 may send the PRS and supplemental signal message 1642 in response to receiving the processing capability message 1634 and/or the processing capability message 1612. As another example, the TRP 600 may send a capability message similar to the processing capability message 1634 indicating that the TRP 600 can process multiple PRS in combination with the aid of one or more supplemental signals and the PRS transmission unit 560 may send the PRS and the supplemental signal(s) to the TRP 600 based on receiving the processing capability message from the TRP 600. In another example implementation, the method 1800 includes scheduling a measurement gap for the receiver spanning the at least one third symbol based on the capability message. For example, the scheduling unit 650 of the TRP 600 may schedule a measurement gap for the supplemental signal. The processor 610 and the memory 630 may comprise means for scheduling the measurement gap.

Also or alternatively, implementations of the method 1800 may include one or more of the following features. In an example implementation, each instance of the first reference signal and each instance of the second reference signal are at least partially non-overlapping in time. For example, the first DL PRS 710 and the second DL PRS 720 are separated in time, but could be partially overlapping in time. In another example implementation, the third set of tones consists of fewer tones in the second frequency range than the second set of tones. For example, the second supplemental signal 740 spans a smaller frequency range than the second DL PRS 720 and may have a lower tone density (sounded tones to total spanned tones) within the second supplemental frequency range 741 than the second DL PRS 720. As another example, the second supplemental signal 940 may span the same or nearly the same frequency range as the second DL PRS 920, but be sounded in fewer RBs than the second DL PRS 920 and may have a lower tone density within the sounded RBs. In another example implementation, the at least one third symbol consists of fewer symbols than the second set of symbols. For example, the second supplemental signal 740 is sounded in a single symbol of the slot 840 while the first DL PRS 710 may be sounded in many symbols, similar to the 12 symbols in which the second DL PRS 720 is sounded in the slot 820. In another example implementation, the method 1800 includes transmitting another signal that is rate matched with the supplemental signal. For example, the TRP 600 may send a PDSCH or PDCCH signal rate matched with the second supplemental signal 940 to use RBs and/or symbols and/or REs not used by the second supplemental signal 940. The processor 610, the memory 630, and the interface 620 (e.g., the wireless transmitter 342 and the antenna 346) may comprise means for transmitting the other signal rate matched with the supplemental signal. In another example implementation, the telecommunication device is a transmission/reception point, and the first reference signal, the second reference signal, and the supplemental signal are transmitted to a user equipment. For example, the telecommunications device may be the TRP 600 and the TRP 600 sends the PRS and supplemental signal message 1642 to the UE 500.

Also or alternatively, implementations of the method 1800 may include one or more of the following features. In an example implementation, the telecommunication device is a user equipment, and the method includes transmitting a capability message to the receiver indicating that the user equipment is capable of transmitting the first reference signal, the second reference signal, and the supplemental signal. For example, the telecommunications device may be the UE 500, and the PRS transmission unit 560 may send transmission capability information in the transmission capability message 1614 to the TRP 600. The processor 510, the memory 530, and the interface 520 (e.g., the wireless transmitter 242 and the antenna 246) may comprise means for transmitting the capability message. In another example implementation, the capability message indicates that the at least one third symbol will overlap in time with the first set of symbols and the third frequency range will overlap the second frequency range. In another example implementation, the method 1800 includes transmitting a transmission characteristic message to the receiver indicating that a plurality of reference signal resources will have similar transmission characteristics. For example, the TRP 600 and/or the UE 500 may send, e.g., in the configuration message 1632 or in the transmission capability message 1614, respectively, an indication that multiple resources will have similar transmission characteristics (e.g., offsets) and the UE 500 and/or the TRP 600, respectively, may use this information to apply the same estimated offset(s) determined from a single supplemental signal to the multiple resources for combined processing of the multiple resources with another reference signal.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device." or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment comprising:
a transceiver;
a memory; and
a processor communicatively coupled to the transceiver and the memory and configured to:

receive, via the transceiver, a first reference signal comprising a first set of tones, per instance of the first reference signal, spanning a first frequency range in a first set of symbols;
receive, via the transceiver, a second reference signal comprising a second set of tones, per instance of the second reference signal, spanning a second frequency range in a second set of symbols, the first frequency range being at least partially different from the second frequency range;
receive, via the transceiver, a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range;
determine at least one offset between the first reference signal and the supplemental signal using the third set of tones from the supplemental signal; and
determine a first indication, of at least one of a time or a range, based on a combination of the first reference signal and the second reference signal using the at least one offset.

2. The user equipment of claim 1, wherein each instance of the first reference signal and each instance of the second reference signal are at least partially non-overlapping in time.

3. The user equipment of claim 1, wherein the third set of tones consists of fewer tones in the second frequency range than the second set of tones.

4. The user equipment of claim 1, wherein the at least one third symbol consists of fewer symbols than the first set of symbols.

5. The user equipment of claim 1, wherein the processor is configured to use the supplemental signal to determine the at least one offset for multiple resources within a resource set of the first reference signal in response to receiving a second indication, the second indication indicating that the multiple resources within the resource set have similar transmission characteristics.

6. The user equipment of claim 1, wherein the processor is configured to send a capability message to a network entity, via the transceiver, indicating that the user equipment is capable of combined processing of the first reference signal and the second reference signal using the supplemental signal.

7. The user equipment of claim 6, wherein the capability message indicates whether a measurement gap is requested for the supplemental signal.

8. The user equipment of claim 1, wherein the supplemental signal is a portion of the second reference signal.

9. The user equipment of claim 1, wherein the processor is configured to send a capability message to a network entity, via the transceiver, indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal.

10. The user equipment of claim 1, wherein the at least one offset comprises at least one of a phase offset, a time offset, or a frequency offset.

11. A user equipment comprising:
means for receiving a first reference signal comprising a first set of tones, per instance of the first reference signal, spanning a first frequency range in a first set of symbols;
means for receiving a second reference signal comprising a second set of tones, per instance of the second reference signal, spanning a second frequency range in a second set of symbols, the first frequency range being at least partially different from the second frequency range;
means for receiving a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range;
means for determining at least one offset between the first reference signal and the supplemental signal using the third set of tones from the supplemental signal; and
means for determining a first indication, of at least one of a time or a range, based on a combination of the first reference signal and the second reference signal using the at least one offset.

12. The user equipment of claim 11, wherein each instance of the first reference signal and each instance of the second reference signal are at least partially non-overlapping in time.

13. The user equipment of claim 11, wherein the third set of tones consists of fewer tones in the second frequency range than the second set of tones.

14. The user equipment of claim 11, wherein the at least one third symbol consists of fewer symbols than the first set of symbols.

15. A method of facilitating position information determination, the method comprising:
receiving, at a user equipment, a first reference signal comprising a first set of tones, per instance of the first reference signal, spanning a first frequency range in a first set of symbols;
receiving, at the user equipment, a second reference signal comprising a second set of tones, per instance of the second reference signal, spanning a second frequency range in a second set of symbols, the first frequency range being at least partially different from the second frequency range;
receiving, at the user equipment, a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range;
determining, at the user equipment, at least one offset between the first reference signal and the supplemental signal using the third set of tones from the supplemental signal; and
determining, at the user equipment, a first indication, of at least one of a time or a range, based on a combination of the first reference signal and the second reference signal using the at least one offset.

16. The method of claim 15, wherein each instance of the first reference signal and each instance of the second reference signal are at least partially non-overlapping in time.

17. The method of claim 15, wherein the third set of tones consists of fewer tones in the second frequency range than the second set of tones.

18. The method of claim 15, wherein the at least one third symbol consists of fewer symbols than the first set of symbols.

19. The method of claim 15, wherein determining the at least one offset comprises using the supplemental signal to determine the at least one offset for multiple resources within a resource set of the first reference signal in response to receiving a second indication, the second indication indicating that the multiple resources within the resource set have similar transmission characteristics.

20. The method of claim 15, further comprising sending a capability message to a network entity indicating that the user equipment is capable of combined processing of the first reference signal and the second reference signal using the supplemental signal.

21. The method of claim 19, wherein the capability message indicates whether a measurement gap is requested for the supplemental signal.

22. The method of claim 15, wherein the supplemental signal is a portion of the second reference signal.

23. The method of claim 15, further comprising sending a capability message to a network entity indicating that the user equipment is capable of sending a transmission supplemental signal in conjunction with a first transmission reference signal and a second transmission reference signal with the first transmission reference signal being at least partially non-overlapping in time with the second transmission reference signal, and the transmission supplemental signal overlapping in time with the first transmission reference signal and the transmission supplemental signal overlapping in frequency with the second transmission reference signal.

24. The method of claim 15, wherein the at least one offset comprises at least one of a phase offset, a time offset, or a frequency offset.

25. A non-transitory, processor-readable storage medium comprising processor-readable instructions configured to cause a processor of a user equipment, to determine position information, to:
receive a first reference signal comprising a first set of tones, per instance of the first reference signal, spanning a first frequency range in a first set of symbols;
receive a second reference signal comprising a second set of tones, per instance of the second reference signal, spanning a second frequency range in a second set of symbols, the first frequency range being at least partially different from the second frequency range;
receive a supplemental signal comprising a third set of tones per instance of the supplemental signal spanning a third frequency range in at least one third symbol, wherein at least one of (1) the third frequency range overlaps the first frequency range, or (2) the at least one third symbol overlaps in time with the first set of symbols and the third frequency range overlaps the second frequency range;
determine at least one offset between the first reference signal and the supplemental signal using the third set of tones from the supplemental signal; and
determine a first indication, of at least one of a time or a range, based on a combination of the first reference signal and the second reference signal using the at least one offset.

26. The storage medium of claim 25, wherein each instance of the first reference signal and each instance of the second reference signal are at least partially non-overlapping in time.

27. The storage medium of claim 25, wherein the third set of tones consists of fewer tones in the second frequency range than the second set of tones.

28. The storage medium of claim 25, wherein the at least one third symbol consists of fewer symbols than the first set of symbols.

29. A telecommunication device comprising:
a transceiver;
a memory; and
a processor communicatively coupled to the transceiver and the memory and configured to:
 transmit, via the transceiver to a receiver, a first reference signal comprising a first set of tones, per instance of the first reference signal, spanning a first frequency range in a first set of symbols;
 transmit, via the transceiver to the receiver, a second reference signal comprising a second set of tones, per instance of the second reference signal, spanning a second frequency range in a second set of symbols, the first frequency range being at least partially different from the second frequency range; and
 transmit, via the transceiver to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

30. The telecommunication device of claim 29, wherein the processor is configured to transmit the first reference signal, the second reference signal, and the supplemental signal in response to a capability message received from the receiver via the transceiver indicating that the receiver is capable of combined processing of the first reference signal and the second reference signal using the supplemental signal.

31. The telecommunication device of claim 30, wherein the processor is configured to schedule a measurement gap for the receiver spanning the at least one third symbol based on the capability message.

32. The telecommunication device of claim 29, wherein each instance of the first reference signal and each instance of the second reference signal are at least partially non-overlapping in time.

33. The telecommunication device of claim 29, wherein the third set of tones consists of fewer tones in the second frequency range than the second set of tones.

34. The telecommunication device of claim 29, wherein the at least one third symbol consists of fewer symbols than the second set of symbols.

35. The telecommunication device of claim 29, wherein the processor is configured to transmit another signal, via the transceiver, that is rate matched with the supplemental signal.

36. The telecommunication device of claim 29, wherein the telecommunication device is a transmission/reception point, and wherein the processor is configured to transmit the first reference signal, the second reference signal, and the supplemental signal via the transceiver to a user equipment.

37. The telecommunication device of claim 29, wherein the telecommunication device is a user equipment, and wherein the processor is configured to transmit a capability message to the receiver, via the transceiver, indicating that the user equipment is capable of transmitting the first reference signal, the second reference signal, and the supplemental signal.

38. The telecommunication device of claim 37, wherein the capability message indicates that the at least one third symbol will overlap in time with the first set of symbols and the third frequency range will overlap the second frequency range.

39. The telecommunication device of claim 29, wherein the processor is configured to transmit, via the transceiver, a transmission characteristic message to the receiver indicating that a plurality of reference signal resources will have similar transmission characteristics.

40. A telecommunication device comprising:
means for transmitting, to a receiver, a first reference signal comprising a first set of tones, per instance of the first reference signal, spanning a first frequency range in a first set of symbols;
means for transmitting, to the receiver, a second reference signal comprising a second set of tones, per instance of the second reference signal, spanning a second frequency range in a second set of symbols, the first frequency range being at least partially different from the second frequency range; and
means for transmitting, to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

41. The telecommunication device of claim 40, wherein the means for transmitting the first reference signal, the means for transmitting the second reference signal, and the means for transmitting the third reference signal are configured to transmit the first reference signal, the second reference signal, and the supplemental signal in response to a capability message received from the receiver indicating that the receiver is capable of combined processing of the first reference signal and the second reference signal using the supplemental signal.

42. The telecommunication device of claim 41, further comprising means for scheduling a measurement gap for the receiver spanning the at least one third symbol based on the capability message.

43. The telecommunication device of claim 40, wherein each instance of the first reference signal and each instance of the second reference signal are at least partially non-overlapping in time.

44. The telecommunication device of claim 40, wherein the third set of tones consists of fewer tones in the second frequency range than the second set of tones.

45. The telecommunication device of claim 40, wherein the at least one third symbol consists of fewer symbols than the second set of symbols.

46. A method for facilitating reference signal measurement, the method comprising:
transmitting, from a telecommunication device to a receiver, a first reference signal comprising a first set of tones, per instance of the first reference signal, spanning a first frequency range in a first set of symbols;
transmitting, from the telecommunication device to the receiver, a second reference signal comprising a second set of tones, per instance of the second reference signal, spanning a second frequency range in a second set of symbols, the first frequency range being at least partially different from the second frequency range; and transmitting, from the telecommunication device to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

47. The method of claim 46, wherein the first reference signal, the second reference signal, and the supplemental signal are transmitted in response to a capability message received by the telecommunication device from the receiver indicating that the receiver is capable of combined processing of the first reference signal and the second reference signal using the supplemental signal.

48. The method of claim 47, further comprising scheduling a measurement gap for the receiver spanning the at least one third symbol based on the capability message.

49. The method of claim 46, wherein each instance of the first reference signal and each instance of the second reference signal are at least partially non-overlapping in time.

50. The method of claim 46, wherein the third set of tones consists of fewer tones in the second frequency range than the second set of tones.

51. The method of claim 46, wherein the at least one third symbol consists of fewer symbols than the second set of symbols.

52. The method of claim 46, further comprising transmitting another signal that is rate matched with the supplemental signal.

53. The method of claim 46, wherein the telecommunication device is a transmission/reception point, and wherein the first reference signal, the second reference signal, and the supplemental signal are transmitted to a user equipment.

54. The method of claim 46, wherein the telecommunication device is a user equipment, and wherein the method further comprises transmitting a capability message to the receiver indicating that the user equipment is capable of transmitting the first reference signal, the second reference signal, and the supplemental signal.

55. The method of claim 54, wherein the capability message indicates that the at least one third symbol will overlap in time with the first set of symbols and the third frequency range will overlap the second frequency range.

56. The method of claim 46, further comprising transmitting a transmission characteristic message to the receiver indicating that a plurality of reference signal resources will have similar transmission characteristics.

57. A non-transitory, processor-readable storage medium comprising processor-readable instructions configured to cause a processor of a telecommunication device, to facilitate reference signal measurement, to:

transmit, to a receiver, a first reference signal comprising a first set of tones, per instance of the first reference signal, spanning a first frequency range in a first set of symbols;

transmit, to the receiver, a second reference signal comprising a second set of tones, per instance of the second reference signal, spanning a second frequency range in a second set of symbols, the first frequency range being at least partially different from the second frequency range; and transmit, to the receiver, a supplemental signal comprising a third set of tones, per instance of the supplemental signal, spanning a third frequency range in at least one third symbol, wherein at least one of (1) the third frequency range overlaps the first frequency range, or (2) the at least one third symbol overlaps in time with the first set of symbols and the third frequency range overlaps the second frequency range.

58. The storage medium of claim 57, wherein the processor-readable instructions configured to cause the processor to transmit the first reference signal, the second reference signal, and the supplemental signal are configured to cause the processor to transmit the first reference signal, the second reference signal, and the supplemental signal in response to a capability message received by the telecommunication device from the receiver indicating that the receiver is capable of combined processing of the first reference signal and the second reference signal using the supplemental signal.

59. The storage medium of claim 58, further comprising processor-readable instructions configured to cause the processor to schedule a measurement gap for the receiver spanning the at least one third symbol based on the capability message.

60. The storage medium of claim 57, wherein each instance of the first reference signal and each instance of the second reference signal are at least partially non-overlapping in time.

61. The storage medium of claim 57, wherein the third set of tones consists of fewer tones in the second frequency range than the second set of tones.

62. The storage medium of claim 57, wherein the at least one third symbol consists of fewer symbols than the second set of symbols.

* * * * *